(12) United States Patent
Yamaoka et al.

(10) Patent No.: US 8,031,869 B2
(45) Date of Patent: Oct. 4, 2011

(54) INFORMATION RECORDING MEDIUM, USAGE MANAGEMENT METHOD, AND USAGE MANAGEMENT APPARATUS

(75) Inventors: Masaru Yamaoka, Kadoma (JP); Takashi Yumiba, Kyotanabe (JP); Takahiro Nagai, Osaka (JP); Hideshi Ishihara, Katano (JP)

(73) Assignee: Panasonic Corporation, Osaka (JP)

( * ) Notice: Subject to any disclaimer, the term of this patent is extended or adjusted under 35 U.S.C. 154(b) by 1526 days.

(21) Appl. No.: 10/504,746

(22) PCT Filed: Mar. 7, 2003

(86) PCT No.: PCT/JP03/02697
§ 371 (c)(1),
(2), (4) Date: Aug. 17, 2004

(87) PCT Pub. No.: WO03/075273
PCT Pub. Date: Sep. 12, 2003

(65) Prior Publication Data
US 2005/0105728 A1    May 19, 2005

(30) Foreign Application Priority Data

Mar. 7, 2002 (JP) ................................ 2002-061433

(51) Int. Cl.
*H04L 9/00* (2006.01)
*G11B 3/64* (2006.01)
(52) U.S. Cl. .......................................... 380/202; 726/31
(58) Field of Classification Search .................. 380/202, 380/201, 204
See application file for complete search history.

(56) References Cited

U.S. PATENT DOCUMENTS

| 5,636,096 | A | 6/1997 | Mardirossian |
| 5,907,443 | A | 5/1999 | Hirata |
| 6,052,242 | A | 4/2000 | Hirata |
| 6,343,281 | B1 | 1/2002 | Kato |
| 6,654,820 | B1 | 11/2003 | Ishibashi et al. |
| 6,687,802 | B1 | 2/2004 | Kori et al. |
| 2002/0135921 | A1 | 9/2002 | Hirata |
| 2003/0188093 | A1 | 10/2003 | Hattori et al. |

(Continued)

FOREIGN PATENT DOCUMENTS
EP  0 545 472    6/1993
(Continued)

OTHER PUBLICATIONS

Makoto Tatebayashi et al., "DVD Content Scramble System", ITE Technical Report, vol. 21, No. 31, May 22, 1997, pp. 15-19.

*Primary Examiner* — Gilberto Barron, Jr.
*Assistant Examiner* — Devin Almeida
(74) *Attorney, Agent, or Firm* — Wenderoth, Lind & Ponack, L.L.P.

(57) ABSTRACT

A digital work (102) and copyright management information (103) for the digital work are recorded on an information recording medium (101) by altering a shape, a position or a pattern (104, 105) of recording mark edges of the digital work. Alternatively, a decryption key for the right management information is recorded on an information recording medium on which the copyright management information has been recorded encrypted, by altering the recording mark edges of the copyright management information. Alternatively, a check code for the copyright management information is recorded on the information recording medium by altering the recording mark edges. The check code is checked when the copyright management information is read, thus detecting illegal use of the copyright management information.

8 Claims, 20 Drawing Sheets

U.S. PATENT DOCUMENTS

| | | |
|---|---|---|
| 2004/0028385 A1 | 2/2004 | Kori et al. |
| 2004/0143754 A1 | 7/2004 | Kori et al. |
| 2007/0033360 A1 | 2/2007 | Kori et al. |

FOREIGN PATENT DOCUMENTS

| | | |
|---|---|---|
| EP | 0 802 535 | 10/1997 |
| EP | 0 813 194 | 12/1997 |
| EP | 0 936 610 | 8/1999 |
| EP | 0 984 346 | 3/2000 |
| EP | 1 041 573 | 10/2000 |
| JP | 3-12070 | 1/1991 |
| JP | 10-64187 | 3/1998 |
| JP | 11-039795 | 2/1999 |
| JP | 2000-195162 | 7/2000 |
| JP | 2000-311114 | 11/2000 |
| JP | 2001-357533 | 12/2001 |
| JP | 2004-87077 | 3/2004 |
| WO | 02/05277 | 1/2002 |
| WO | 02/25645 | 3/2002 |

FIG.5

| | | |
|---|---|---|
| SY0 | 1ST FRAME | |
| SY1 | 3RD FRAME | SY5 | 2ND FRAME |
| SY2 | 5TH FRAME | SY5 | 4TH FRAME |
| SY3 | 7TH FRAME | SY5 | 6TH FRAME |
| SY4 | 9TH FRAME | SY5 | 8TH FRAME |
| SY1 | 11TH FRAME | SY6 | 10TH FRAME |
| SY2 | 13TH FRAME | SY6 | 12TH FRAME |
| SY3 | 15TH FRAME | SY6 | 14TH FRAME |
| SY4 | 17TH FRAME | SY7 | 16TH FRAME |
| SY1 | 19TH FRAME | SY7 | 18TH FRAME |
| SY2 | 21ST FRAME | SY7 | 20TH FRAME |
| SY3 | 23RD FRAME | | 22ND FRAME |
| SY4 | 25TH FRAME | | 24TH FRAME |
| | | | 26TH FRAME |

FIG.6

| | | | 501 | | | | | | 502 | | | | | | |
|---|---|---|---|---|---|---|---|---|---|---|---|---|---|---|---|
| SY0 | SY1 | SY2 | SY3 | SY4 | SY1 | SY2 | SY3 | SY4 | SY1 | SY2 | SY3 | SY4 |
| 1ST FRAME | 3RD FRAME | 5TH FRAME | 7TH FRAME | 9TH FRAME | 11TH FRAME | 13TH FRAME | 15TH FRAME | 17TH FRAME | 19TH FRAME | 21ST FRAME | 23RD FRAME | 25TH FRAME |
| | SY5 | SY5 | SY1 | SY5 | SY5 | SY6 | SY2 | SY6 | SY6 | SY7 | SY7 | SY7 | SY7 |
| | 2ND FRAME | 4TH FRAME | 6TH FRAME | 8TH FRAME | 10TH FRAME | 12TH FRAME | 14TH FRAME | 16TH FRAME | 18TH FRAME | 20TH FRAME | 22ND FRAME | 24TH FRAME | 26TH FRAME |

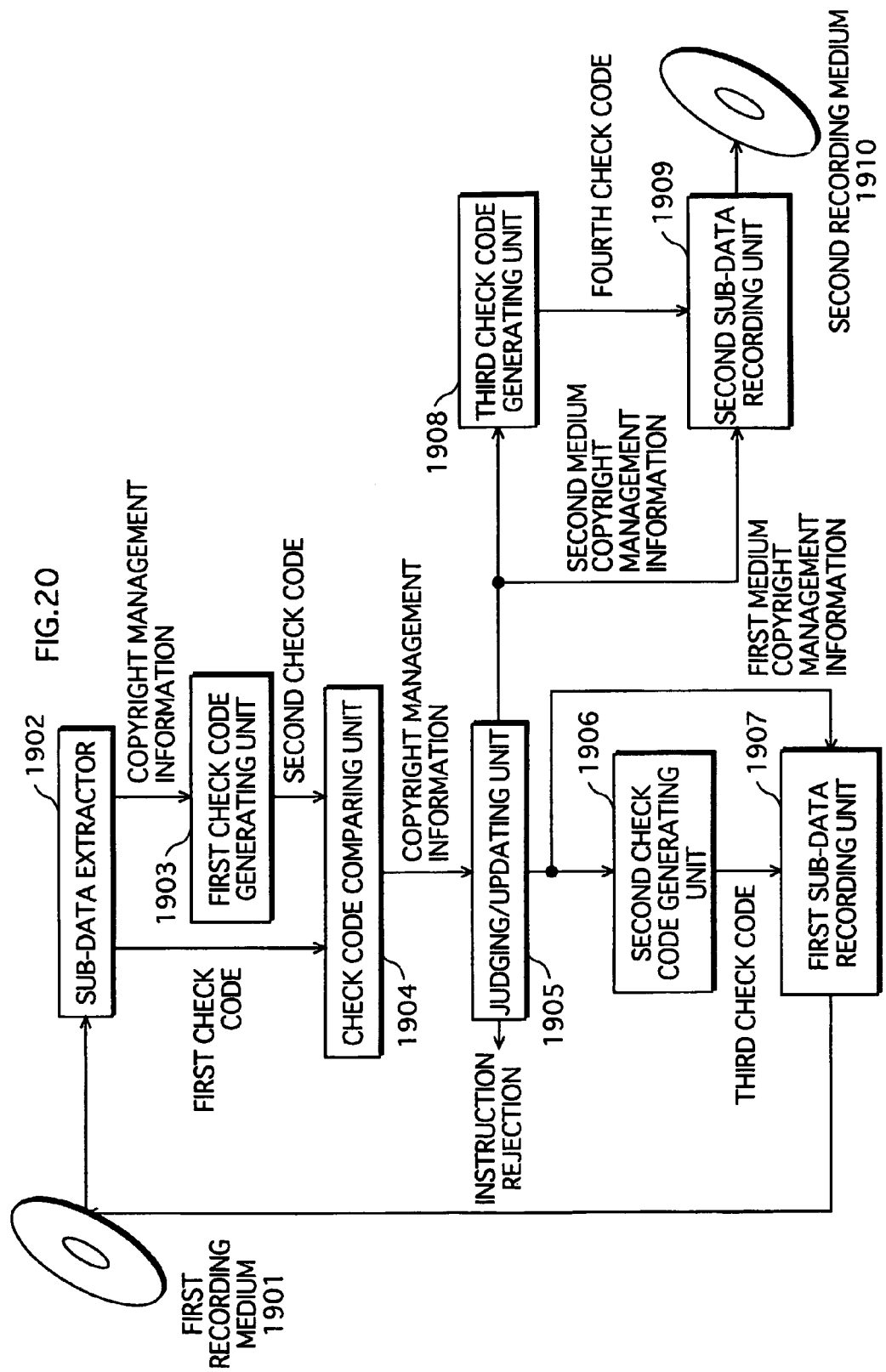

INFORMATION RECORDING MEDIUM, USAGE MANAGEMENT METHOD, AND USAGE MANAGEMENT APPARATUS

TECHNICAL FIELD

The present invention relates to an information recording medium, a usage management method and a usage management apparatus, and in particular to a technique for controlling usage of a digital copyrighted work with use of sub-data embedded in main data.

BACKGROUND ART

Optical discs, of which DVDs (Digital Versatile/Video Discs) are representative, have become common as recording media for recording large amounts of digital data, such as AV (audio/video) data and computer data. For example, playback-only optical discs having two hours or more of high-quality moving images recorded thereon are on the market. Such digital data that is subject to copyright is called a digital copyrighted work (hereinafter referred to simply a "digital work").

In recent years, content scrambling systems have been introduced to prevent digital works being copied illegally to other recording media. For descriptions of such systems, refer to Makoto TATEBAYASHI et al., "DVD Content Scramble System", ITE Technical Report Vol. 21, No. 31, pp. 15-19, VIR '97-26 (May, 1997), and NIKKEI ELECTRONICS, Nov. 18, 1996 (No. 676), pp. 13-14.

A content scrambling system scrambles compressed digital content, such as a movie, with use of three layers of secret keys (a title key, a disc key and a master key), and records the scrambled data on an information recording medium in a user information area that is accessible by a user.

The most important of the secret keys, the master key, is known only to manufacturers who have a legitimate license. The disc key and the title key, which are unique to each DVD and each title respectively, are scrambled based on the master key and stored on the information recording medium in a control information area that is not accessible by the user. This restricts access by the user to the secret keys that are necessary for unscrambling, and therefore prevents the digital content being copied illegally by means such as copying files.

The focus of research and development in the field of scrambling in recent years has been moving away from copyright protection for protecting copyrighted information and towards copyright control that provides digital copyrighted works conveniently for the user.

SD memory cards, which are semiconductor memories, are exemplary of such convenience for the user. Such an information recording medium (hereinafter referred to simply as a "recording medium") is provided with a protected area in addition to the user area. The protected area, which is accessible only by the system, stores copyright management information relating to rights for moving, copying, or the like, of the corresponding digital work. This enables the digital work to be moved or copied within the scope of the rights.

FIG. 1 illustrates a method proposed in Japanese patent no. 2981448 for one type of copyright management, specifically, moving a digital work between recording media when the recording media do not have protected areas for recording copyright management information.

This method realizes safe movement of a digital work by first moving the digital work that is recorded in a recording area 2003 of a first medium 2001 to a recording area 2005 of a second medium 2002, and then deleting management information 2004 of the first medium 2001 that includes position information of the recording area 2003.

However, in this method, the digital work can be moved freely, and it is not possible to control, for example, the number of times that the digital work is permitted to be moved. Furthermore, even if the move times is managed by recording such information in the user area, the user may tamper with the information. If usage rights of a digital work recorded on an optical disc are to be controlled, it is necessary to provide a protected area such as described for semiconductor memories on the optical disc.

To provide a protected area that is not accessed by the user, it is impossible to use a physical medium efficiently. Furthermore, in order to implement rights management in a recording medium, such as an optical disc, that does not have a protected area for recording copyright management information, it would be necessary to change the specifications of the recording medium itself. For these reasons, rights management is not presently implemented in such recording media.

The object of the present invention, which solves this problem, is to provide a recording medium that prevents a digital copyrighted work that is recorded thereon from being copied exactly as is, and, even in a recording medium that does not have a separate protected area, enables rights management of recorded digital copyrighted works; and an usage method for the recording medium.

DISCLOSURE OF THE INVENTION

An information recording medium of the present invention is a information recording medium on which a digital work is recorded as main data, wherein copyright management information for the digital work is recorded in an area on the information recording medium in which the digital work is recorded, as sub-data superimposed on the main data.

Furthermore, an information recording medium of the present invention is An information recording medium on which a digital work and copyright management information for the digital work are recorded as main data, wherein the copyright management information is recorded in an encrypted state, and a decryption key for the copyright management information is recorded in an area on the information recording medium in which the digital work is recorded, as sub-data superimposed on the main data.

Furthermore, an information recording medium of the present invention an information recording medium on which a digital work and copyright management information for the digital work are recorded as main data, wherein a check code for the copyright management information is recorded in an area on the information recording medium in which the digital work is recorded, as sub-data superimposed on the main data.

Here, the main data may recorded using recording marks, and the sub-data may recorded by altering one of a position, a shape and a pattern of the recording marks.

Here, the sub-data may recorded by displacing recording mark edges in a tangential direction.

Here, a SYNC code may recorded in a predetermined position in the area, and the sub-data may be recorded by altering one of a pattern and the position of the SYNC code.

Here, the copyright management information may include a condition for one of playing back, moving, and copying the digital work.

Here, the condition for playing back the digital work may include one of a possible playback times, a possible playback time, and a possible playback term, the condition for moving the digital work may include one of a possible move times, a possible move time, and a possible move term, and the condition for copying the digital work may include one of a possible copy times, a possible copy time, and a possible copy term.

Here, a plurality of digital works may recorded on the information recording medium, and copyright management information may be recorded individually for each digital work.

A usage management method of the present invention regulates use of a digital work, the digital work being recorded on an information recording medium as main data, and copyright management information for the digital work being recorded in an area on the information recording medium in which the digital work is recorded, as sub-data superimposed on the main data, the method including: a sub-data extracting step of, when the digital work is read from the information recording medium, extracting the copyright management information from the information recording medium; a usage prohibiting step of prohibiting usage of the digital work in accordance with a condition designated in the copyright management information; an updating step of updating the copyright management information in accordance with the condition; and a sub-data recording step of recording the updated copyright management information in the area in which the main data is recorded, as sub-data superimposed on the main data.

Here, the method may further include a usage request receiving step of receiving a usage request, and having the sub-data extracting step, the usage prohibiting step, the updating step and the sub-data recording step performed as one process.

Furthermore, a usage management method of the present invention regulates usage of a digital work, the digital work and encrypted copyright management information for the digital work being recorded on an information recording medium as main data, and a decryption key for the copyright management information being superimposed on the main data as sub-data, the method including: a sub-data extracting step of, when the main data is read from the information recording medium, extracting the decryption key from the information recording medium; a decrypting step of decrypting the encrypted copyright management information with use of the extracted decryption key; a usage prohibiting step of prohibiting usage of the digital work in accordance with a condition designated in the decrypted copyright management information; an updating step of updating the copyright management information in accordance with the condition; an encrypting step of encrypting the updated copyright management information; and a sub-data recording step of recording the decryption key in an area of the information recording medium in which the main data is recorded, as sub-data superimposed on the main data.

Here, the method may further include a usage request receiving step of receiving a usage request, and having the sub-data extracting step, the decrypting step, the usage prohibiting step, the updating step, the encrypting step and the sub-data recording step performed as one process.

Furthermore, a usage management method of the present invention regulates usage of a digital work, the digital work and copyright management information for the digital work being recorded on an information recording medium as main data, and a first check code for the copyright management information being superimposed on the main data as sub-data, the method including: a sub-data extracting step of, when the main data is read from the information recording medium, extracting the first check code from the information recording medium; a second check code generating step of generating a second check code from the read right management information; a check code comparing step of comparing the first check code and the second check code; a usage prohibiting step of, when the first check code and the second check code are judged to be identical, prohibiting usage in accordance with a condition designated in the copyright management information; an updating step of updating the copyright management information in accordance with the condition; a third check code generating step of generating a third check code from the updated copyright management information; and a sub-data recording step of recording the third check code in an area of the information recording medium in which the main data is recorded, as sub-data superimposed on the main data.

Here, the method may further include a usage request receiving step of receiving a usage request, and having the sub-data extracting step, the second check code generating step, the check code comparing step, the usage prohibiting step, the updating step, the third check code generating step and the sub-data recording step performed as one process.

Here, the main data may be recorded using recording marks, the sub-data may be recorded by altering one of a position, a shape, and a pattern of the recording marks, and the sub-data extracting step may read the main data by referring to the recording mark, and read the sub-data by referring to the alteration of the one of the position, the shape, and the pattern of the recording marks.

Here, the sub-data may be recorded by displacing recording mark edges in a tangential direction, and the sub-data extracting step may read the sub-data by detecting the displacement.

Here, a SYNC code may be recorded in a predetermined position in the area in which the main data is recorded, and the sub-data may be recorded by altering one of a pattern and the position of the SYNC code, and the sub-data extracting step may read the sub-data by referring to the one of the altered pattern and the altered position.

Here, the copyright management information may include a condition for one of playing back, moving and copying the digital work, and the updating step may update the copyright management information in accordance with a condition that is included in the copyright management information and that corresponds to the usage request.

Here, the condition for playing back the digital work may include one of a possible playback times, a possible playback time, and a possible playback term, the condition for moving the digital work may include one of a possible move times, a possible move time, and a possible move term, and the condition for copying the digital work may include one of a possible copy times, a possible copy time, and a possible copy term.

Here, the main data may be recorded using recording marks, the sub-data may be recorded by altering one of a position, a shape, and a pattern of the recording marks, and the sub-data recording step may record the main data by forming recording marks, and record the sub-data by altering one of a position, a shape, and a pattern of the recording marks.

Here, the sub-data may be recorded by displacing recording mark edges in a tangential direction.

Here, a SYNC code may recorded in a predetermined position in the area, and the sub-data recording step may record the sub-data by altering one of a pattern and the position of the SYNC code.

Here, the updating step may erase part or all of the main data or the sub-data in accordance with the condition.

A usage management apparatus of the present invention regulates usage of a digital work, the digital work being recorded on an information recording medium as main data, and copyright management information for the digital work being recorded in an area on the information recording medium in which the digital work is recorded, as sub-data superimposed on the main data, the usage management apparatus including: a sub-data extracting unit operable to, when the digital work is read from the information recording medium, extract the copyright management information from the information recording medium; a usage prohibiting unit operable to prohibit usage of the digital work in accordance with a condition designated in the copyright management information; an updating unit operable to update the copyright management information in accordance with the condition; and a sub-data recording unit operable to record the updated copyright management information in the area in which the main data is recorded, as sub-data superimposed on the main data.

Here, the usage management apparatus may further include: a usage request receiving unit operable to receive a usage request, and have the sub-data extracting unit, the usage prohibiting unit, the updating unit and the sub-data recording unit operate as one process.

Furthermore, a usage management apparatus of the present invention regulates usage of a digital work, the digital work and encrypted copyright management information for the digital work being recorded on an information recording medium as main data, and a decryption key for the copyright management information being superimposed on the main data as sub-data, the usage management apparatus including: a sub-data extracting unit operable to, when the main data is read from the information recording medium, extract the decryption key from the information recording medium; a decrypting unit operable to decrypt the encrypted copyright management information with use of the extracted decryption key; a usage prohibiting unit operable to prohibit usage of the digital work in accordance with a condition designated in the decrypted copyright management information; an updating unit operable to update the copyright management information in accordance with the condition; an encrypting unit operable to encrypt the updated copyright management information; and a sub-data recording unit operable to record the decryption key in an area of the information recording medium in which the main data is recorded, as sub-data superimposed on the main data.

Here, the usage management apparatus may further include: a usage request receiving unit operable to receive a usage request, and have the sub-data extracting unit, the decrypting unit, the usage prohibiting unit, the updating unit, the encrypting unit and the sub-data recording unit operate as one process.

Furthermore, a usage management apparatus of the present invention regulates usage of a digital work, the digital work and copyright management information for the digital work being recorded on an information recording medium as main data, and a first check code for the copyright management information being superimposed on the main data as sub-data, the usage management apparatus including: a sub-data extracting unit operable to, when the main data is read from the information recording medium, extract the first check code from the information recording medium; a second check code generating unit operable to generate a second check code from the read right management information; a check code comparing unit operable to compare the first check code and the second check code; a usage prohibiting operable to, when the first check code and the second check code are judged to be identical, prohibit usage in accordance with a condition designated in the copyright management information; an updating unit operable to update the copyright management information in accordance with the condition; a third check code generating unit operable to generate a third check code from the updated copyright management information; and a sub-data recording unit operable to recording the third check code in an area of the information recording medium in which the main data is recorded, as sub-data superimposed on the main data.

Here, the usage management apparatus may further include: a usage request receiving unit operable to receive a usage request, and have the sub-data extracting unit, the second check code generating unit, the check code comparing unit, the usage prohibiting unit, the updating unit, the third check code generating unit and the sub-data recording unit operate as one process.

Here, the main data may be recorded using recording marks, the sub-data may be recorded by altering one of a position, a shape and a pattern of the recording marks, and the sub-data extracting unit may read the main data by referring to the recording mark, and read the sub-data by referring to the alteration of the one of the position, the shape and the pattern of the recording marks.

Here, the sub-data may be recorded by displacing recording mark edges in a tangential direction, and the sub-data extracting unit may read the sub-data by detecting the displacement.

Here, a SYNC code may be recorded in a predetermined position in the area in which the main data is recorded, the sub-data may be recorded by altering one of a pattern and the position of the SYNC code, and the sub-data extracting unit reads the sub-data by referring to the one of the altered pattern and the altered position.

Here, the copyright management information may include a condition for one of playing back, moving, and copying the digital work, and the updating step may update the copyright management information in accordance with a condition that is included in the copyright management information and that corresponds to the usage request.

Here, the condition for playing back the digital work may include one of a possible playback times, a possible playback time, and a possible playback term, the condition for moving the digital work may include one of a possible move times, a possible move time, and a possible move term, and the condition for copying the digital work may include one of a possible copy times, a possible copy time, and a possible copy term.

Here, the main data may be recorded using recording marks, and the sub-data may be recorded by altering one of a position, a shape, and a pattern of the recording marks, and the sub-data recording unit may record the main data by forming recording marks, and records the sub-data by altering one of a position, a shape, and a pattern of the recording marks.

Here, the sub-data recording unit may record the sub-data by displacing recording mark edges in a tangential direction.

Here, a SYNC code may be recorded in a predetermined position in the area, and the sub-data recording unit may record the sub-data by altering one of a pattern and the position of the SYNC code.

Here, the updating unit may erase part or all of the main data or the sub-data in accordance with the condition.

BRIEF DESCRIPTION OF THE DRAWINGS

FIG. 5 shows a sector structure of a typical DVD-RAM;

FIG. 6 shows an example of a sector structure of main data on which sub-data is superimposed using a second sub-data superimposing method;

FIG. 20 is a function block drawing showing function blocks necessary for copy control processing in the third embodiment.

BEST MODE OF CARRYING OUT THE INVENTION

The following describes in detail a best mode for carrying out the invention, with reference to the drawings.

1. First Embodiment

Figure 1:
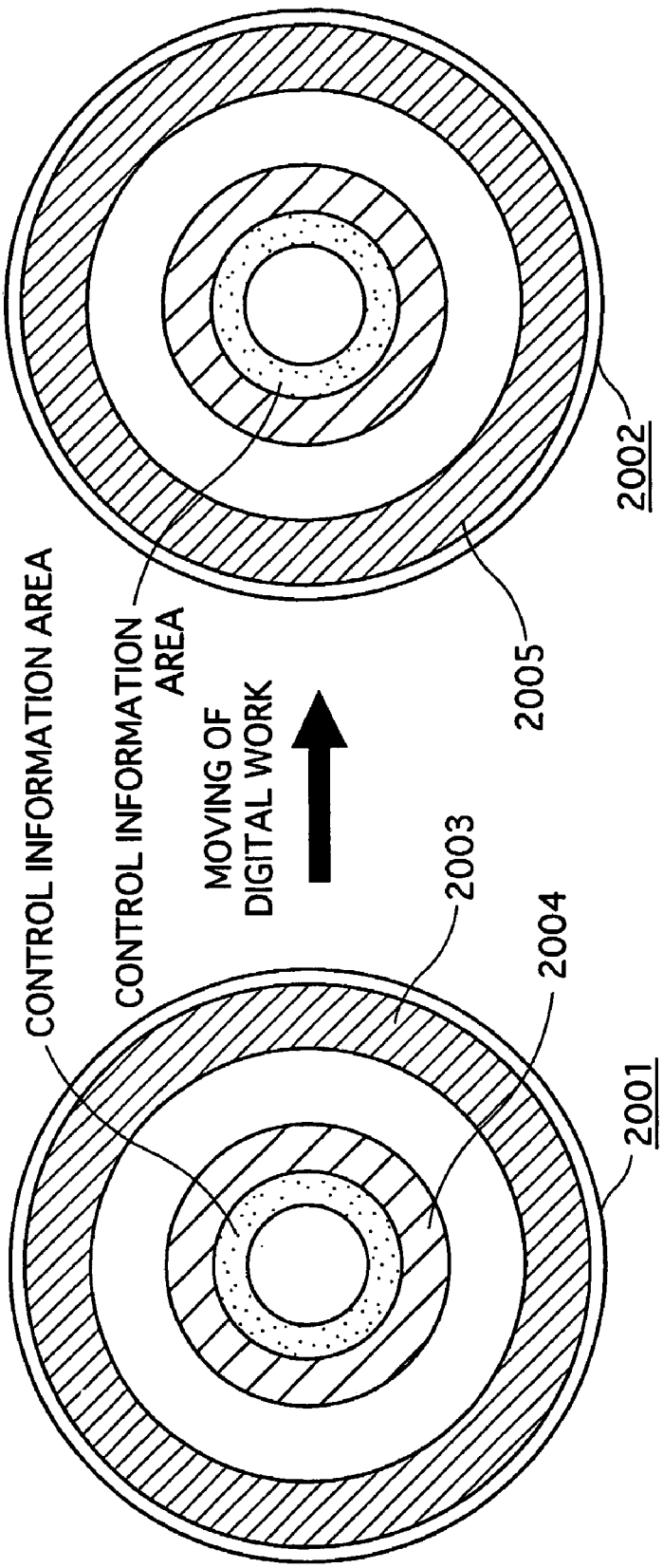
FIG. 1 is a schematic diagram of a conventional method for moving a digital work between recording media.
Figure 2:
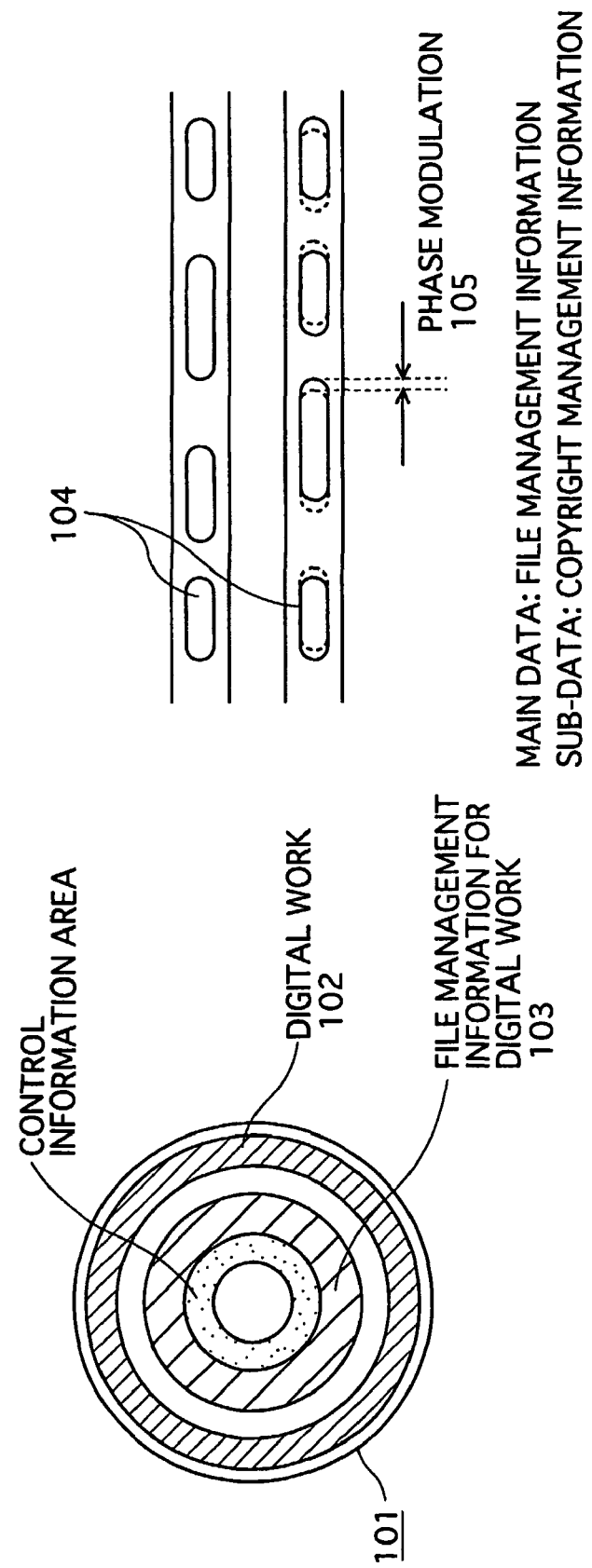
FIG. 2 shows the structure of a recording medium of the first embodiment.

FIG. 2 shows the structure of a recording medium of a first embodiment of the present invention. A recording medium (hereinafter simply referred to as a "recording medium") 101 in the present embodiment is an optical disc. Recorded on the recording medium 101 as main data are a digital work 102, and file management information 103 that shows information such as a position where the digital work 102 is recorded on the recording medium 101. The digital work 102 and the management information 103 are recorded on the recording medium 101 by forming optical-readable recording marks in the user area. Copyright management information about the digital work 102 is recorded as sub-data that is superimposed on the file management information by varying the shape, position or pattern of the recording marks of the file management information.

In the present embodiment, two sub-data superimposing methods, i.e., a first sub-data superimposing method and a second sub-data superimposing method, are described for superimposing sub-data on main data such as the described file management information.

(1) First Sub-Data Superimposing Method

The first sub-data superimposing method records sub-data such as the described file management information, by intentionally altering the position of the recording mark edges of the main data slightly backward or slightly forward.

Figure 3:
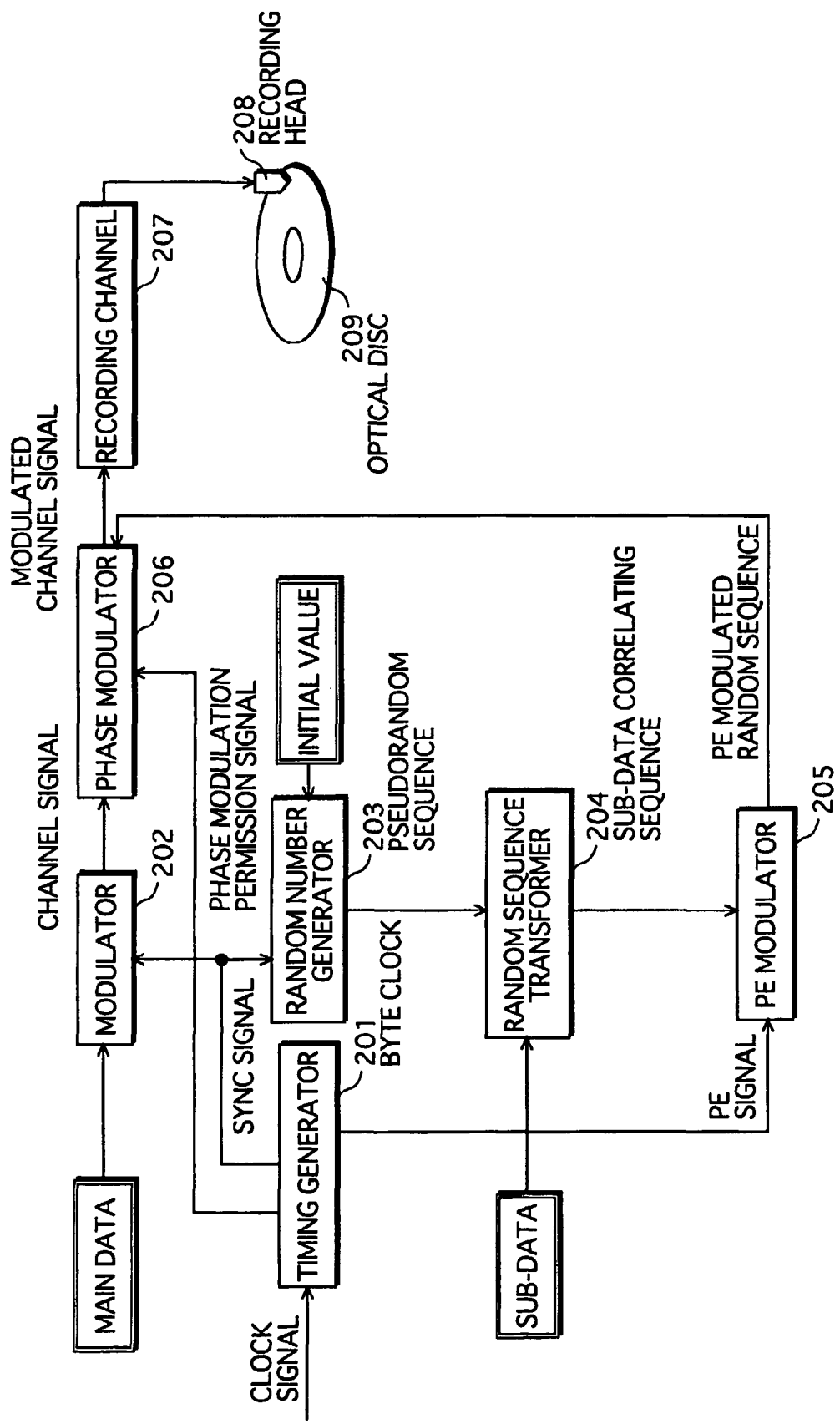
FIG. 3 is a typical function block drawing of an optical disc recorder relating to a first sub-data superimposing method.

FIG. 3 shows a typical function block diagram of an optical disc recorder of the first sub-data superimposing method.

The optical disc recorder of the first sub-data superimposing method records main data using recording marks, and superimposes sub-data on the main data by displacing each recording mark edge slightly backward or slightly forward of a reference position. The optical disc recorder includes a timing generator 201, a modulator 202, a random number generator 203, a random sequence transformer 204, a phase encoded modulator (PE modulator) 205, a phase modulator 206, a recording channel 207 and a recording head 208.

The timing generator 201, on receiving notification from a system controller (not illustrated) to start recording main data and sub-data, outputs a synchronous signal showing a timing with which a synchronous pattern is to be inserted in recording data, to the modulator 202 and the random number generator 203.

In addition, the timing generator 201 outputs a byte clock that is synchronized with each byte of recording data, based on the synchronous signal and a clock signal, to the random number generator 203, and outputs a PE signal to the PE modulator 205. The PE signal divides each byte equally into "H" and "L" blocks.

The modulator 202 inserts a synchronization pattern in the input recording data (main data), based on the synchronization signal from the timing generator 201, and, after modulator modulating each main data 8-bit code (byte) to be recorded into a corresponding 16-channel bit length code, generates a channel signal according to NRZI coding (non-return to zero invert coding), and outputs the channel signal to the phase modulator 206.

The random number generator 203 presets an initial value with the timing of the synchronization signal from the timing generator 201, generates a 1-bit pseudorandom sequence with the byte clock timing, and outputs the pseudorandom sequence to the random sequence transformer 204.

The random sequence transformer 204 performs calculation for correlating the pseudorandom sequence from the random number generator 203 and the sub-data. The random sequence transformer of the present embodiment is composed of an exclusive OR, and performs inversion/non-inversion of a random sequence according to the sub-data to be recorded. The transformed random sequence (sub-data correlating sequence) is output to the PE modulator 205 in this way.

The PE modulator 205 generates a PE modulated random sequence by PE modulating the sub-data correlating signal from the random sequence transformer 204, based on the PE signal from the timing generator 201, and outputs the PE modulated random sequence to the phase modulator 206.

The phase modulator 206 is a functional element that superimposes sub-data on main data by displacing the edge of the channel signal that records the main data slightly forward or slightly backward by a set amount. The phase modulator 206 is composed of 3-input 1-output selector and a delay device that delays the edge of the channel signal from the modulator 202 slightly. When sub-data is not superimposed the phase modulator 206 delays the recording mark edge by a delay amount d. When the random number in the PE modulated random sequence is "0", the phase modulator 206 delays the recording mark edge by a delay amount 2d. Furthermore, when the random number in the PE modulated random sequence is "1", the phase modulator 206 outputs the recording mark edge as is, without delaying.

Accordingly, when the random number in the PE modulated sequence is "1", the phase modulator 206 displaces the edge of the channel signal to a position that is a time Td forward of the recording mark edge to which sub-data is not superimposed. Furthermore, when the random number in the PE modulated sequence is "0", the phase modulator 206 displaces the edge of the channel signal to a position that is the time Td backward of the recording mark edge to which sub-data is not superimposed. Accordingly, a modulated channel signal is generated and output to the recording channel 207.

The recording channel 207 generates a control signal that adjusts output of the laser that irradiates the optical disc, in synchronization with the modulated channel signal from the phase modulator 206, and inputs the control signal to the recording head 208. The recording head 208 adjusts the laser according to the control signal from the recording channel, and forms an optical-readable modulated recording mark on the optical disc 209.

The optical disc recorder in the described first sub-data imposition method generates an optical disc on which not only main data such as file management information is recorded by forming a recording mark, but also sub-data is superimposed on the main data by intentionally displacing the position of the recording mark edge of the main data slightly.

The following describes an optical disc player that plays back the optical disc generated by the optical disc recorder in the first sub-data superimposing method. The optical disc player not only reads the main data recorded on the optical disc by the optical disc recorder according to the first sub-data superimposing method, but also simultaneously reads the superimposed sub-data.

Figure 4:
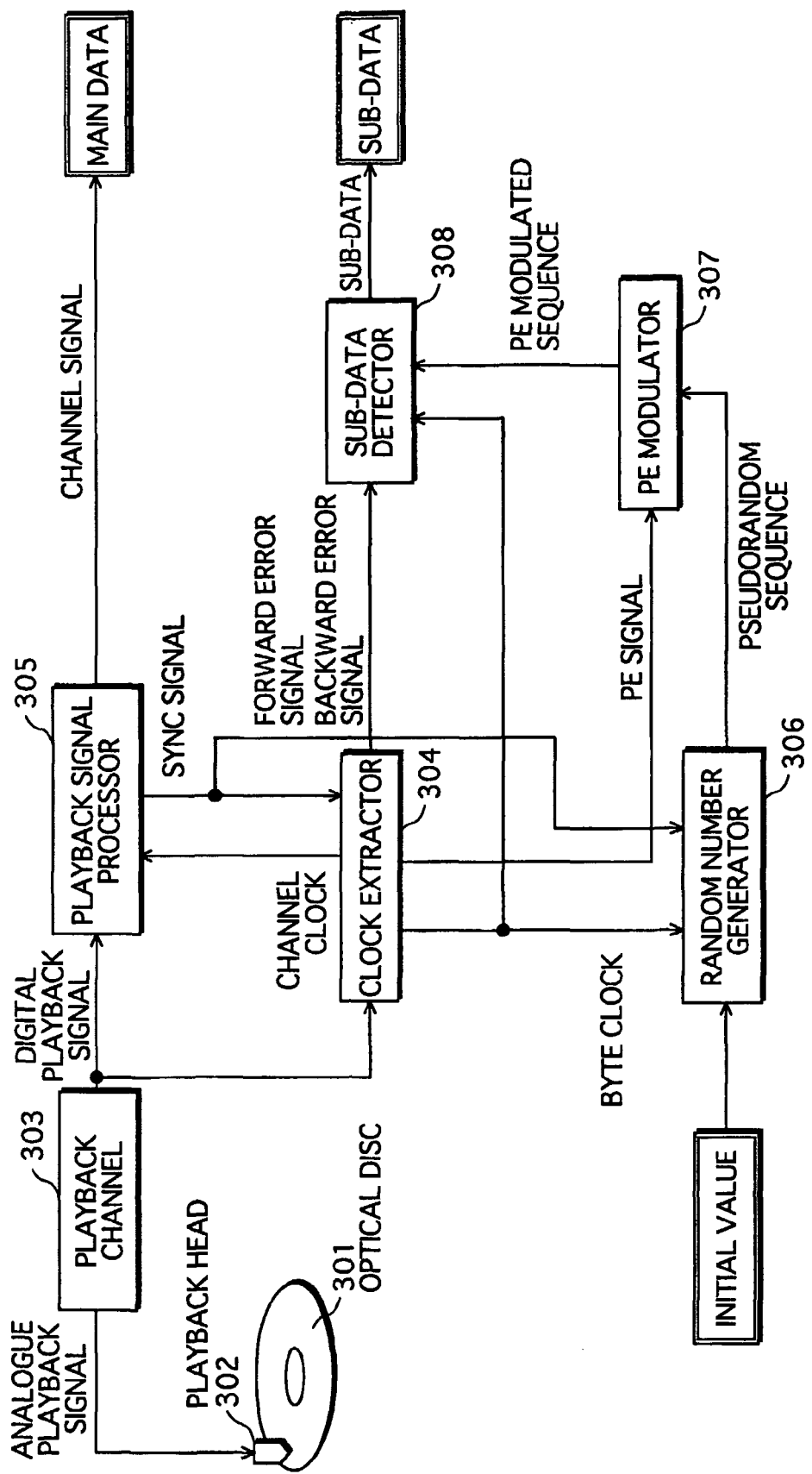
FIG. 4 is a typical function block drawing of an optical disc player relating to the first sub-data superimposing method.

FIG. 4 is a typical function block diagram of the optical disc player. As shown in FIG. 4, the optical disc player includes a playback head 302, a playback channel 303, a clock extractor 304, a playback signal processor 305, a random number generator 306, a PE modulator 307 and a sub-data detector 308.

The playback head 302 irradiates an optical beam on the recording mark on a rotating optical disc 301, generates an analogue playback signal by receiving the reflected light with a photodiode, and outputs the analogue playback signal to the playback channel 303. The playback channel 303 converts the received analogue playback signal to a digital playback signal by equalizing and shaping the waveform of the digital playback signal, and outputs the digital playback signal to the clock extractor 304 and the playback signal processor 305.

The clock extractor 304 generates a channel clock in synchronization with the channel bit, based on the playback signal from the playback channel 302, and outputs the channel clock to the playback signal processor 305. The clock extractor 304 also generates a byte clock in synchronization with pieces of recording data (in byte-units) in the playback signal, and outputs the byte clock to the random number generator 306 and the sub-data detector 308.

Simultaneous to this, the clock extractor 304 extracts the phase error of the playback signal with reference to the channel clock. When the phase error is detected to be forward, the clock extractor 304 generates a forward error signal, and when the phase error is detected to be backward, the clock extractor 304 generates a backward error signal. The clock extractor 304 then outputs the generated error signal to the sub-data detector 308.

The playback signal processor 305 detects the preamble (synchronization pattern) included in the received playback signal, generates a synchronization signal, and outputs the generated synchronization signal to the clock extractor 304 and the random number generator 306. Furthermore, the playback signal processor 305 synchronizes the playback signal from the modulated recorded data in the preamble, and generates a channel signal (main data) by demodulating the information of the 8-bit recording data that corresponds to the 16-bit channel code.

The random number generator 306 presets an initial value according to the synchronization signal received from the playback signal processor 305. The random number generator 306 also generates a pseudorandom sequence one bit at a time according to the byte clock received from the clock extractor 304, and outputs the pseudorandom sequence to the PE modulator 307.

The PE modulator 307 generates a PE modulated random number series by applying PE modulation to the pseudorandom sequence output from the random number generator 306, following the PE signal from the clock extractor 304, and outputs the generated PE modulated random sequence to the sub-data detector 308.

The sub-data detector 308 calculates the correlation between the PE modulated random sequence output from the PE modulator and the forward error signal and the backward error signal. The sub-data detector 308 has an up/down counter.

The sub-data detector 308 adds 1 to the value of the internal up/down counter when the PE modulated random sequence is "1" and the forward error signal is "H", or when the PE modulated random sequence is "0" and the backward error signal is "H". The sub-data detector 308 subtracts "1" from the value of the internal up/down counter when the PE modulated random sequence is "1" and the forward error signal is "L", or when the PE modulated random sequence is "0" and the backward error signal is "L".

The sub-data detector 308 continues to update the up/down counter in each range that the smallest unit of sub-data is superimposed. Each time the superimposed range is finished, the sub-data detector 308 outputs a bit "1" as sub-data if the total value of the up/down counter is a positive number, and outputs a bit "0" as sub-data if the total value of the up/down counter is a negative number.

After the 1-bit sub-data has been output in this way, the sub-data detector 308 resets the value of the up/down counter. By repeating the described processing in the range in which the sub-data is superimposed, the sub-data detector 308 ultimately extracts all the bits of the sub-data.

Since the sub-data superimposed on the main data according to the first sub-data superimposing method as described is recorded according to jitter modulation, the sub-data does not appear in an ordinary playback signal, and therefore can be treated as information that cannot be copied illegally or tampered with.

(2) Second Sub-Data Superimposing Method

The second sub-data superimposing method superimposes sub-data on main data, which is recorded by inserting a SYNC code in the user area of the recording medium, by altering a SYNC code. The following describes the second sub-data Superimposing method, using an example where the recording medium is a DVD-RAM.

FIG. 5 shows the sector structure of a typical DVD-RAM. As shown in FIG. 5, each sector, which is a unit of recorded data, is composed of 26 frames. Each frame is given one of eight types of SYNC codes, which is recorded in the frame.

The SYNC codes are used for synchronization during playback. In addition, the series of SYNC codes enable the number of the present frame position to be judged. The SYNC codes are defined as follows.

(SY7, SY0)=1st frame
(SY0, SY5)=2nd frame
(SY5, SY1)=3rd frame
(SY1, SY5)=4th frame
(SY5, SY2)=5th frame
(SY2, SY5)=6th frame
(SY5, SY3)=7th frame
(SY3, SY5)=8th frame
(SY5, SY4)=9th frame
(SY4, SY5)=10th frame
(SY5, SY1)=11th frame
(SY1, SY6)=12th frame
(SY6, SY2)=13th frame
(SY2, SY6)=14th frame
(SY6, SY3)=15th frame
(SY3, SY6)=16th frame
(SY6, SY4)=17th frame
(SY4, SY6)=18th frame
(SY6, SY1)=19th frame
(SY1, SY7)=20th frame
(SY7, SY2)=21st frame
(SY2, SY7)=22nd frame
(SY7, SY3)=23rd frame
(SY3, SY7)=24th frame
(SY7, SY4)=25th frame
(SY4, SY7)=26th frame FIG. 6 shows an example of the sector structure when sub-data is superimposed on main data using the second sub-data superimposing method. In the second sub-data superimposing method, sub-data is superimposed by altering the SYNC code of the second, fourth, sixth, eighth, twelfth, fourteenth, sixteenth and eighteenth frames. These particular frames are the frames among the second to twenty-fifth frames that are not greatly influenced by altering the SYNC code.

As shown in FIG. 6, a frame group 501 is composed of the second, fourth, sixth and eight frames. The SYNC code of the sixth frame in the frame group 501 has been altered from SY5 (see FIG. 5) to SY1. Furthermore, in a frame group 502 composed of the twelfth, fourteenth, sixteenth and eighteenth frames, the SYNC code of the fourteenth frame has been altered from SY6 (see FIG. 5) to SY2.

Note that the number of frames whose SYNC code is altered in each frame group is not limited to one. Furthermore, in the present embodiment, SYNC codes maybe altered to any of SY1 through to SY4.

Consequently, according to the second sub-data imposition method, the SYNC signals of each of the four frames in the respective frame groups 501 and 502 in one sector can be altered to another four types of SYNC codes. Therefore, since the SYNC patterns can be altered in 256 ways, 8-bit (1-byte) sub-data can be recorded.

DVD-RAMs use ECC blocks (error correction code blocks) as logical units for reading and writing. Since one ECC block of data has sixteen sectors, 128 bits of sub-data can be recorded in each ECC block using the second sub-data superimposing method.

Figure 7:
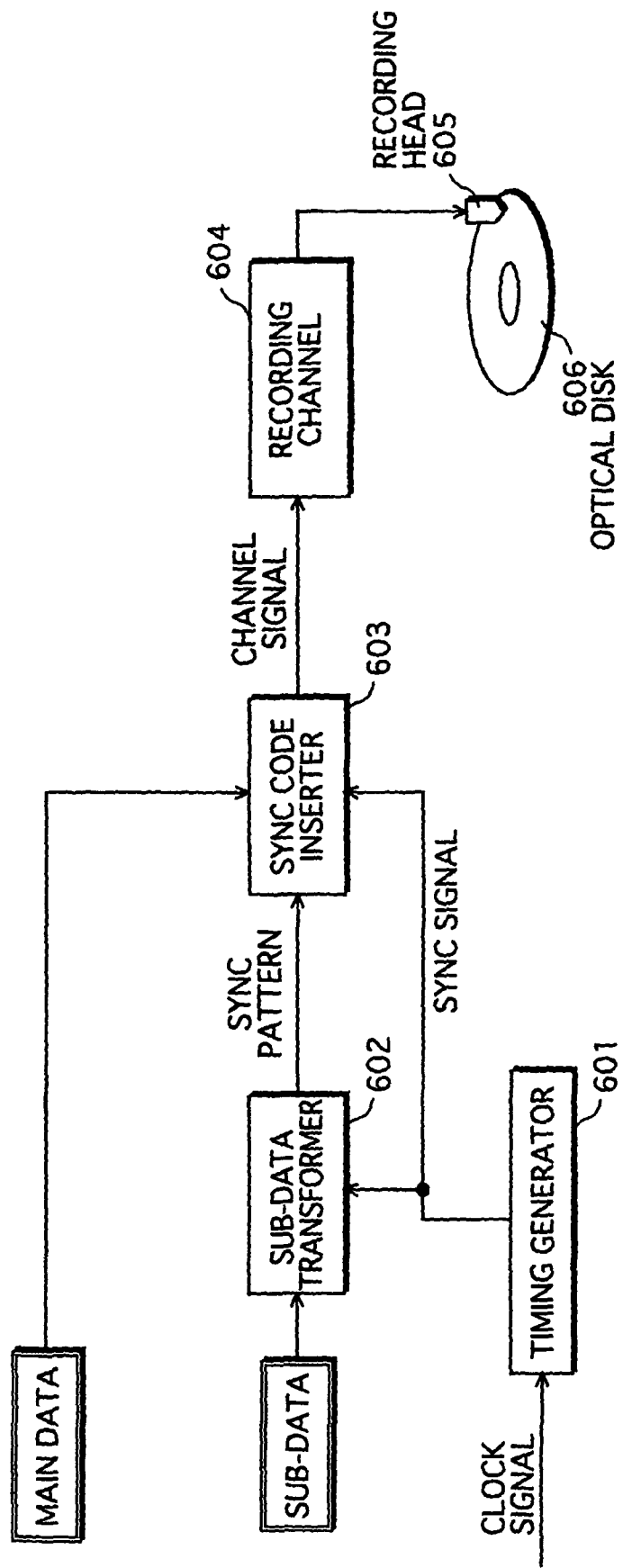
FIG. 7 is a typical function block drawing of an optical disc recorder relating to the second sub-data superimposing method.

In this way, the second sub-data superimposing method records sub-data by altering the SYNC code in the frame of the sector in which main data is recorded. FIG. 7 is a function block diagram showing a typical function structure of the optical disc recorder that uses the second sub-data superimposing method.

As shown in FIG. 7, the optical disc recorded of the second sub-data superimposing method is composed of a timing generator 601, a sub-data transformer 602, a SYNC code inserter 603, a recording channel 604 and a recording head 605.

The timing generator 601 generates a SYNC signal that shows a timing for inserting the SYNC code pattern in the recording data, and outputs the SYNC signal to the SYNC code inserter 603.

The sub-data transformer 602 has a transformation table that shows the 256 possible combinations of SYNC codes that correspond to the 8-bit information, as an internal secure region. On receiving an instruction from a system controller (not illustrated) to recording main data on which sub-data is superimposed, the sub-data transformer 602 obtains 8 bits of sub-data for each sector of main data to be recorded.

The sub-data transformer 602 searches the transformation table for the SYNC code that corresponds to the obtained 8-bit sub-data, and determines the SYNC code pattern. The sub-data transformer 602 then outputs the SYNC code pattern to the SYNC code inserter 603 in synchronization with the SYNC signal from the timing generator 601.

The SYNC code inserter 603 transforms the received main data eight bits at a time into corresponding 16-bit data. The SYNC code inserter 603 then generates a channel signal by inserting the SYNC codes from the sub-data transformer 602 into the main data in synchronization with the SYNC signal from the timing generator 601, and outputs the generated channel signal to the recording channel 604.

The recording channel 604 generates a control signal that controls the power of the laser that is irradiated on the optical disc, in synchronization with the channel signal from the SYNC code inserter 603, and outputs the control signal to the recording head 605.

The recording head 605 controls the laser power based on the control signal from the recording channel 604, and forms an optical-readable modulated recording mark on the optical disc 606.

The main data and sub-data recorded on the optical disc by the optical disc recorder according to the second sub-data superimposing method as described are played back by the optical disc player according to the second sub-data superimposing method.

Figure 8:
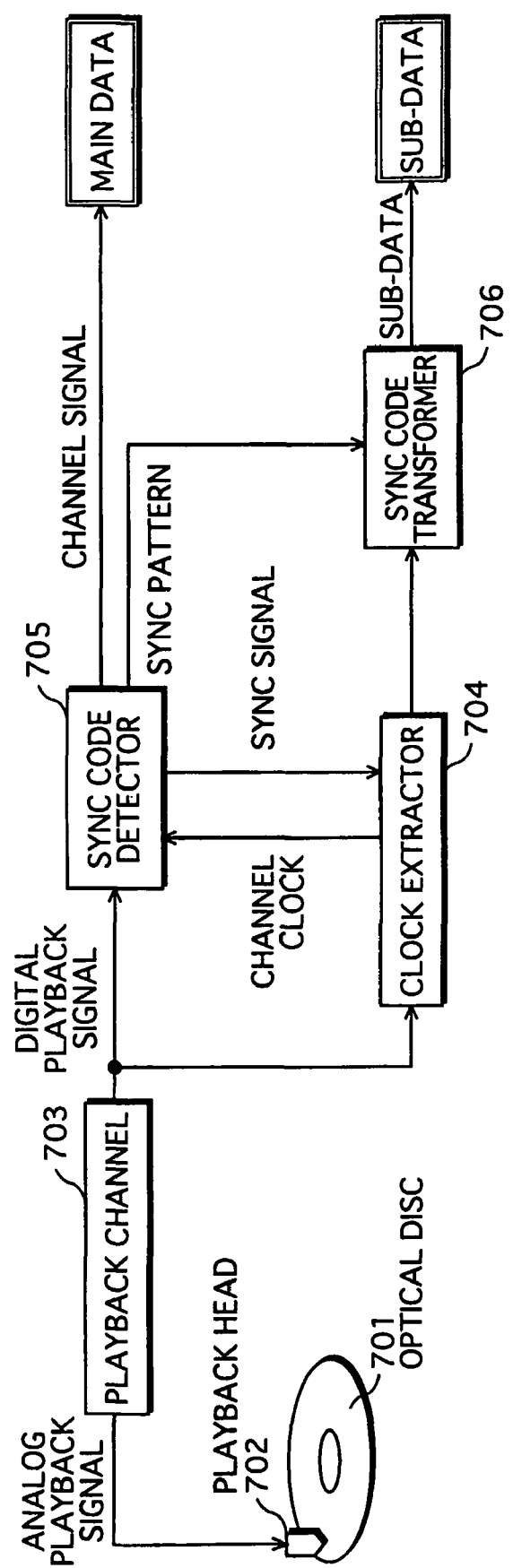
FIG. 8 is a typical function block drawing of an optical disc player relating to the second sub-data superimposing method.

FIG. 8 is a function block diagram showing a typical function structure of the optical disc player that uses the second sub-data superimposing method. As shown in FIG. 8, the optical disc player of the second sub-data superimposing method includes a playback head 702, a playback channel 703, a clock extractor 704, a SYNC code detector 705 and a SYNC code transformer 706.

The playback head 702 irradiates an optical beam on the recording mark on a rotating optical disc 701, generates an analogue playback signal by receiving the reflected light with a photodiode, and outputs the analogue playback signal to the playback channel 703.

The playback channel 703 converts the received analogue playback signal to a digital playback signal by equalizing and shaping the waveform of the digital playback signal, and outputs the digital playback signal to the clock extractor 704 and the SYNC code detector 705.

The clock extractor 704 generates a channel clock, which is in synchronization with the channel bits, from the digital playback signal from the playback channel 702, and outputs the channel clock to the SYNC code detector 705.

The SYNC code detector 705 detects the SYNC code pattern included in the digital playback signal from the playback channel 702, and outputs the SYNC code pattern to the SYNC code transformer 706. In addition, the SYNC code detector 705 generates a SYNC signal that shows the timing with which the SYNC code pattern was detected, and outputs the SYNC signal to the clock extractor 704.

Furthermore, the SYNC code detector 705 extracts the 16-bit channel codes from the digital playback signal in synchronization with the SYNC signal, and restores the 8-bit main data corresponding to the channel codes.

The SYNC code transformer 706 first stores 26 SYNC code patterns (26 frames' worth) from the SYNC code detector 705 in order from the SYNC pattern expressing the head of the sector. The SYNC code transformer 706 stores a transformation table for transforming SYNC code patterns into sub-data. The transformation table, which is stored secretly, shows the correspondence between the 256 possible combinations of SYNC code patterns and the 8-bit sub-data.

The SYNC code transformer 706 refers to the transformation table to obtain the 8-bit sub-data corresponding to each SYNC code pattern. By performing the processing repeatedly, the SYNC code transformer 706 ultimately restores all bits of the sub-data.

According to the second sub-data superimposing method, sub-data is recorded by altering SYNC codes as described. Therefore, recording of the sub-data has no effect whatsoever on main data, in other words, ordinary playback data. Furthermore, since only the SYNC codes are altered when recording sub-data to a recording medium in the second sub-data superimposing method, there is no deterioration in the signal quality of the main data.

Here, a problem arises that both the main data and the sub-data can be copied to another recording medium illegally by snooping on the digital playback signal from the playback channel 703 and reading the main data and sub-data. This kind of illegal act can be dealt with as follows.

Specifically, when the sub-data is recorded according to the second sub-data superimposing method to a recording medium (e.g. a DVD-RAM) that has a media ID that is unique to the recording medium, the sub-data can be encrypted and then recorded on the recording medium, and then decrypted using the media key as a decryption key when read.

In this way, even if both the main data and the sub-data are copied to another recording medium, the sub-data cannot be decrypted because the media ID is different. This prevents illegal use of the digital work.

(3) Modifications of the First Embodiment

The sub-data superimposing method of the present embodiment is not limited to the described first sub-data superimposing method which displaces recording mark edges and the second sub-data superimposing method which alters SYNC codes, and alternative sub-data superimposing methods may be used.

One example of an alternative sub-data superimposing method is displacing recording marks along a radius of a disc-shaped recording medium. Another possible method is to record sub-data using redundant modulation patterns that are not ordinarily used in modulation during recording and playback. A sub-data superimposing method that alters the position, shape, or pattern of recording marks is also possible.

Furthermore, for example, as disclosed in Japanese patent application publication no. 11-86436 and Japanese patent application publication no. 11-213554, sub-data may be recorded with use of specific bit information in an area of the recording medium in which main data is stored, and the specific bit information may be corrected with use of an error correction code when reading the main data (Cf. Hitoshi MIYAKAWA et al., "Coding Theory", The Institute of Electronics, Information and Communication Engineers, 2001).

Furthermore, as disclosed in Japanese patent application publication no. 2000-3560 and Japanese patent application publication no. 2000-57058, sub-data may be divided using, for example, a (k,n) secret sharing scheme, and the sub-data may be superimposed on main data that has been error correction coded (cf. Hideki IMAI, "Coding Theory", The Institute of Electronics, Information and Communication Engineers (CORONA Publishing), 1990).

(4) Copyright Management Information

In the present embodiment, copyright management information denotes playback control information, move control information, copy control information and the like relating to the digital work recorded in the user area of the recording medium.

(4-1) Playback Control Information

Playback control information is information relating to the digital work that is recorded on a recording medium, showing whether the digital work is permitted to be played back. The playback control information includes a "possible playback times" that limits the number of times the digital work is played back, a "possible playback time" that designates a time for which playback is permitted, and a "possible playback term" that designates a term during which playback is permitted.

The possible playback times is reduced by 1 each time the digital work recorded in the user area is played back. The digital work is not played back when the possible playback times is "0".

A particular length of time is set as the initial value of the possible playback time. Each time the digital work is played back time is measured from start to end of the playback, and when playback has ended, the measured time is subtracted from the possible playback time, and the resulting value becomes the new possible playback time. The digital work is not played back when the possible playback time is "0".

The possible playback term is a term during which playback of the digital work is permitted. When a possible playback term is designated, it is first judged before playback whether the present time falls within the possible playback term. The digital work is played back if the present time is within the possible playback term, and is not played back if the present time is not within the possible playback term.

(4-2) Move Control Information

Move control information is information relating to the digital work that is recorded on a first recording medium, showing whether the digital work is permitted to be moved to a second recording medium. The move control information includes a "possible move times" for controlling the number of times that the digital work is moved, and a "possible move term" for controlling the term during which the digital work is permitted to be moved.

The possible move times is given a particular number of times as an initial value. The possible move times is reduced by "1" when the digital work recorded in the user area of a first recording medium is moved to a second recording medium. The digital work is not moved when the possible move times is "0".

Moving the digital work is generally completed by the digital work on the first recording medium being voided. The new possible move times may be recorded to the second recording medium either before or after moving the digital copyrighted work. Alternatively, the possible move times may be recorded while the digital copyrighted work is being moved.

The possible move term is a term during which the digital copyrighted work is permitted to be moved. When a possible move term is designated, it is first judged before moving the digital work whether the present time is within the possible move term. The digital work is moved if the present time is within the possible move term, and not moved if the present time is not within the possible move term.

(4-3) Copy Control Information

Copy control information is information relating to the digital work recorded on a first recording medium, showing whether the digital work is permitted to be copied to a second recording medium. The copy control information includes a "possible copy times" for controlling the number of times the digital work is permitted to be copied, and a "possible copy term" for controlling the term during which the digital work is copied.

The possible copy times is the same as the maximum number of copies that are permitted to be made of the digital work, and is given a particular number of times as an initial value. The possible copy times is reduced by "1" when the digital work recorded in the user area of a first recording medium is copied to a second recording medium, and the resulting value is recorded on the first recording medium as a new possible copy times.

It is possible to not record a possible copy times on the second recording medium to which the digital work is copied, or to record the possible copy times as "0". Whichever the case, the copy processing is complete when copyright management information that prohibits copying using the digital work recorded on the second recording medium has been recorded on the second recording medium.

Note that the digital work is not copied when the permitted copy times is "0". Furthermore, when the digital work is moved back from the second recording medium to the first recording medium, the value of the possible copy times may be increased by "1".

The possible copy term is a term in which copying of the digital work is permitted. When a possible copy term is designated, it is first judged before copying the digital work whether the present time is within the possible copy term. The digital work is copied if the present time is within the possible copy term, and not copied if the present time is not within the possible copy term.

Note that copyright management information prohibiting copying of the digital work is recorded on the second recording medium together with the digital work.

(4-4) Other Copyright Management Information

The copyright management information of the present invention is not limited to the specific examples described above. For example, the copyright management information may permit copying and moving of the digital work to a second recording medium without restriction, but prohibit distribution of the digital work via a network such as the Internet.

Furthermore, the move control information and the copy control information may, for example, limit the destination to which the digital work is moved or copied. Information for controlling the destination of copying or moving is an effective way of managing rights for recording media in which copyright management information cannot be updated, such as DVD-R and CD-R.

The same effects as the present invention can also be achieved even if information other than that described above is used as copyright management information.

(5) Playback Control Processing in the Present Embodiment

Figure 9:
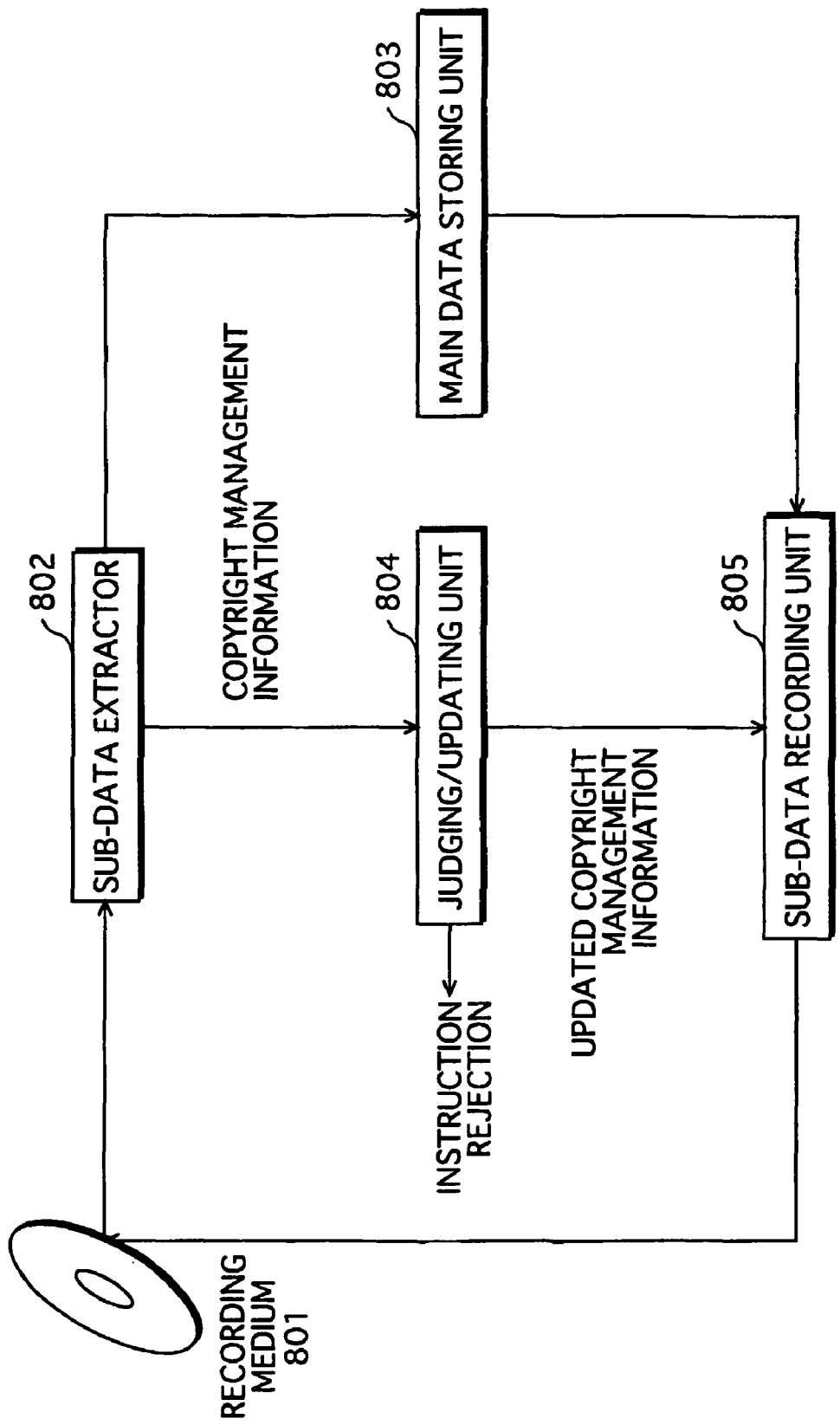
FIG. 9 shows the necessary function blocks for executing playback control processing when playing back a digital work in a case in which the digital work and playback control information therefor are recorded on the recording medium of the present embodiment.

The following describes playback control processing in the present embodiment, with reference to the drawings. FIG. 9 is a function block drawing showing necessary function blocks in playback control processing executed when playing back a digital work, in a case in which the digital work and playback control information therefor are recorded on a recording medium.

As shown in FIG. 9, playback control processing in the present embodiment is realized by combining function blocks, specifically, a sub-data extractor 802, a main data storing unit 803, a judging/updating unit 804 and a sub-data recording unit 805. The example described here is of applying the playback control processing to a optical disc, specifically a recording medium 801.

The digital work is recorded in the user area of the recording medium 801 together with file management information such as position information about the position of the digital work. In addition, copyright management information about the digital work is recorded in the user area with use of, for example, one of the sub-data superimposing methods described earlier.

Here, the playback control information recorded on the recording medium 801 may be any of the described permitted playback times, permitted playback time and permitted playback term.

The sub-data extractor 802, on receiving a playback instruction from the system controller, reads the file management information of the digital work recorded on the recording medium 801 from the recording medium 801, and also reads the copyright management information for the digital work from the recording medium 801.

The sub-data extractor 802 outputs the file management information to the main data storing unit 803, and the copyright management information to the judging/updating unit 804. The main data storing unit 803 temporarily stores the file management information from the sub-data extractor 802.

The judging/updating unit 804 corresponds to the player to which the sub-data superimposing methods were described earlier as being applied. On receiving the copyright management information from the sub-data extractor 802, the judging/updating unit 804 judges whether the digital work is permitted to be played back, by referring to the playback control information included in the copyright management information.

When, for example, a permitted playback times is included in the copyright management information, the judging/updating unit 804 judges whether the permitted playback times is "0", and if the judgement is negative, permits playback of the digital work. If the judgement is positive, the judging/updating unit 804 rejects the playback instruction and ends the processing.

After completing playback of the digital work, the judging/updating unit 804 subtracts "1" from the permitted playback times of the digital work, and outputs the copyright management information that includes the updated permitted playback times to the sub-data recorder 805.

When, for example, a permitted playback time is included in the copyright management information, the judging/updating unit 804 judges whether the permitted playback time is "0", and if the judgement is negative, permits playback of the digital work. If the judgement is positive, the judging/updating unit 804 rejects the playback instruction and ends the processing.

After playback of the digital work is finished, the judging/updating unit 804 calculates the time for which the digital work was played back. A new possible playback time is obtained by subtracting the obtained time from the original possible playback time. The judging/updating unit 804 outputs the copyright management information updated in this way to the sub-data recording unit 805.

When, for example, a possible playback period is included in the copyright management information, the judging/updating unit 804 judges whether the present time is included in the possible play back term, and if the judgement is positive, permits playback of the digital work. If the judgement is negative, the judging/updating unit 804 rejects the playback instruction, and ends the processing.

The sub-data recording unit 805 corresponds to the recorder to which the sub-data superimposing methods were described earlier as being applied. After playback of the digital work has ended, the sub-data recording unit 805 records the file management information stored in the main data storing unit 804 and the copyright management information received from the judging/updating unit 804 on the recording medium 801 as main data and sub-data, respectively. In this way, only the copyright management information relating to the digital work is updated on the recording medium.

According to the present invention, by using the copyright management information recorded on the recording medium as sub-data to permit playback of a digital work only when predetermined conditions are met as described, illegal usage of the digital work can be prevented. Furthermore, by updating only the copyright management information when the digital work is played back, the copyright of the digital work can be managed safely.

(6) Move Control Processing in the Present Embodiment

Figure 10:
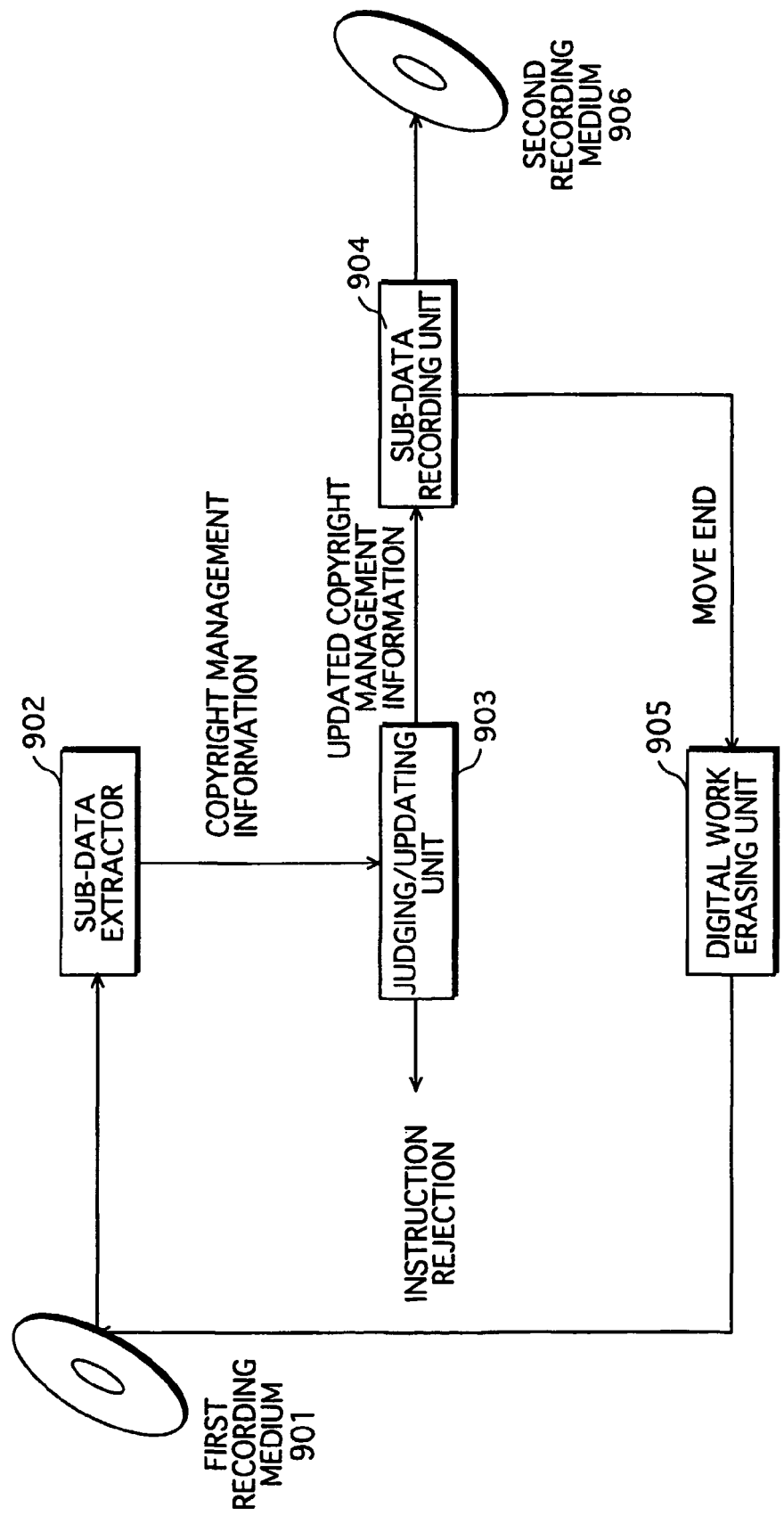
FIG. 10 shows the necessary function blocks for executing move control processing when moving a digital work in a case in which the digital work and move control information therefor are recorded on the recording medium of the present embodiment.

The following describes move control processing in the present embodiment, with reference to the drawings. FIG. 10 is a function block diagram showing necessary function blocks for executing move control processing when moving a digital work, in a case in which the digital work and move control information therefor are recorded on the recording medium of the present embodiment.

As shown in FIG. 10, move control processing in the present embodiment is realized by combining a sub-data extractor 902, a judging/updating unit 903, a sub-data recording unit 904 and a digital work erasing unit (hereinafter referred to simply as an "erasing unit") 905.

Note that FIG. 10 shows a case of moving a digital work from a recording medium 901 to a recording medium 906. The information recording media 901 and 906 are both optical discs, and store file management information that includes position information about the digital work and so on in the user area. Copyright management information for the digital work is recorded, for example, with use of one of the described sub-data superimposing methods.

The sub-data extractor 902 corresponds to the player to which the sub-data superimposing methods were described earlier as being applied. On receiving a move instruction from the system controller, the sub-data extractor 902 reads the file management information for the digital work recorded on the recording medium 901, and also reads the copyright management information of the digital work. The sub-data extractor 902 then outputs the file management information and the copyright management information to the judging/updating unit 903.

The judging/updating unit 903 judges whether moving of the digital work is permitted, by referring to the received copyright management information received from the sub-data extractor 902.

When, for example, a possible move times is designated as the move control information, the judging/updating unit 903 judges whether the possible move times is zero, and permits the digital work to be moved if the judgement is negative. If the judgement is positive, the judging/updating unit 903 rejects the move instruction and ends the processing.

When, for example, a possible move term is designated as the move control information, the judging/updating unit 903 judges whether the present time is within the possible move term, and if the judgement is positive, permits the digital work to be moved. If the judgement is negative, the judging/updating unit 903 rejects the move instruction and ends the processing.

When the digital work is moved, the judging/updating unit 903 subtracts "1" from the possible move times, and outputs the copyright management information that includes the updated possible move times to the sub-data recording unit 904.

When the digital work is permitted to be moved, the sub-data recording unit 904 records the file management information and the updated copyright management information on the recording medium 906, which is the move destination, as main data and sub-data, respectively. After the move has finished, the sub-data recording unit 904 notifies the erasing unit 905 that the move has finished.

On receiving notification that the move has finished, the erasing unit 905 erases the file management information of the digital work from the recording medium 901.

As described, according to the present embodiment, moving of a digital work between recording media can be controlled by referring to the move control information included in the copyright management information. In addition, the copyright of the digital work can be managed even more safely by erasing the digital work from the original recording medium 901 straight after the move to the destination recording medium 906 as been completed.

(7) Copy Control Processing in the Present Embodiment

Figure 11:
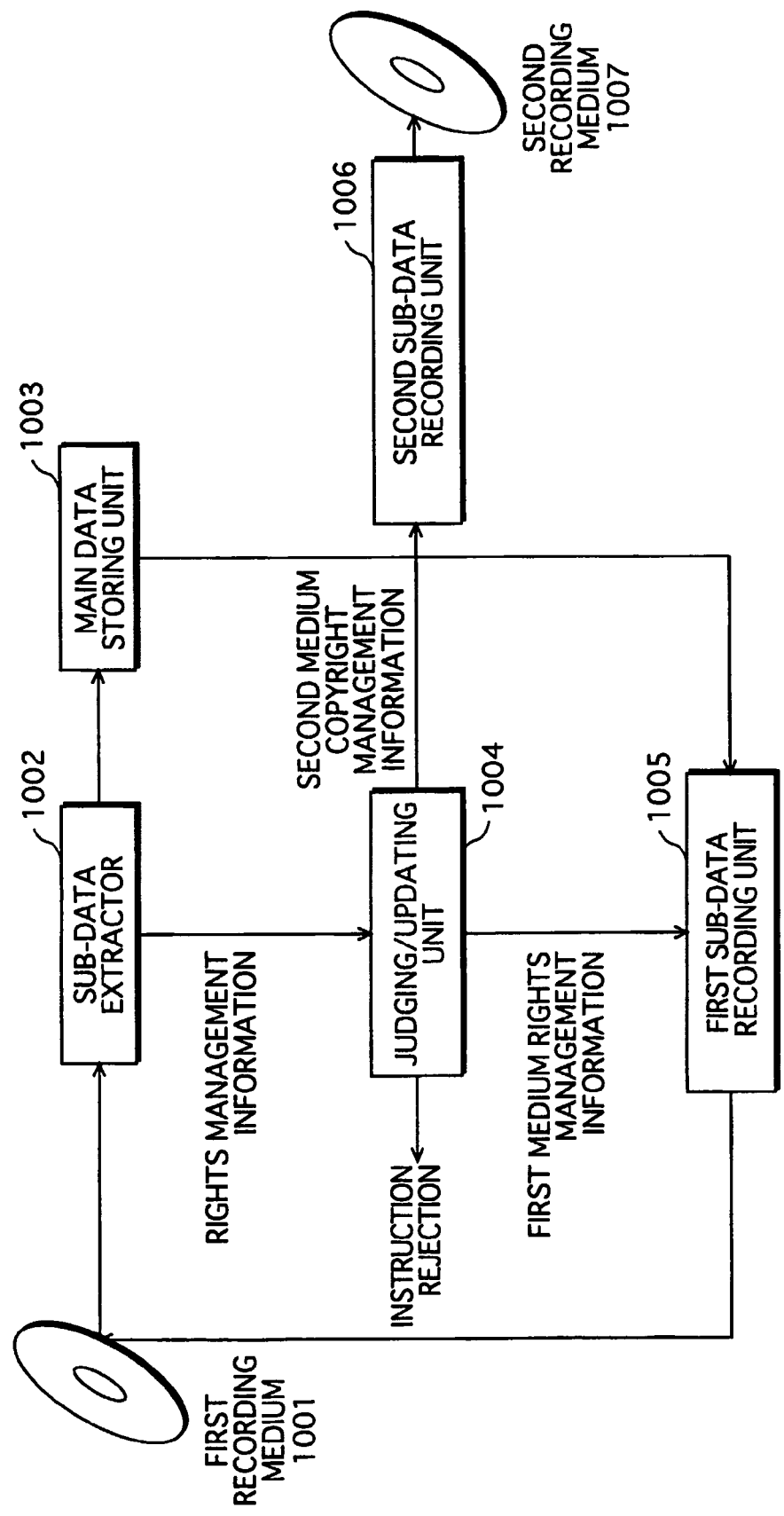
FIG. 11 shows the necessary function blocks for executing copy control processing when moving a digital work in a case in which the digital work and copy control information therefor are recorded on the recording medium of the present embodiment.

The following describes copy control processing in the present embodiment, with reference to the drawings. FIG. 11 is a function block diagram showing necessary function blocks for executing copy control processing when copying a digital work, in a case in which the digital work and copy control information therefor are recorded on the recording medium of the present embodiment.

As shown in FIG. 11, copy control processing in the present embodiment is realized by combining a sub-data extractor 1002, a main data storing unit 1003, a judging/updating unit 1004, a first sub-data recording unit 1005 and a second sub-data recording unit 1006.

Note that FIG. 11 shows a case of copying a digital work recorded on a recording medium 1001 to a recording medium 1007. The information recording media 1001 and 1007 are both optical discs, and store file management information that includes position information about the digital work and so on in the user area. Copyright management information for the digital work is recorded, for example, with use of one of the described sub-data superimposing methods.

On receiving a copy instruction from the system controller, the sub-data extractor 1002 reads the file management information of the digital work recorded on the recording medium

1001, and also reads the copyright management information for the digital work. The sub-data extractor 1002 then outputs the file management information to the main data storing unit 1003 and the copyright management information to the judging/updating unit 1004.

The main data storing unit 1003 receives the file management information from the sub-data extractor 1002, and stores the file management information temporarily.

The judging/updating unit 1004 judges whether copying of the digital work is permitted, by referring to the copy control information included in the copyright management information received from the sub-data extractor 1002.

When, for example, a possible copy times is designated as the copy control information, the judging/updating unit 1004 judges whether the permitted copy times is "0", and if the judgement is negative, permits copying of the digital work. If the judgement is positive, the updating/judgement unit 1004 rejects the copy instruction and ends the processing.

When, for example, a possible copy term is designated as the copy control information, the judging/updating unit 1004 judges whether the present time is within the possible copy term, and if the judgement is positive, permits copying of the digital work. If the judgement is negative, the judging/updating unit 1004 rejects the copy instruction and ends the processing.

When copying of the digital work is permitted, the judging/updating unit 1004 subtracts "1" from the value of the possible copy times, and outputs updated copyright management information to the first sub-data recording unit 1005. In addition, the judging/updating unit 1004 generates copyright management information in which the possible copy times is "0", and outputs the generated copyright management information to the second sub-data recording unit 1006 as copyright management information for the digital work copied to the recording medium 1007.

The first sub-data recording unit 1005 corresponds to the recorder to which the sub-data superimposing methods were described earlier as being applied. When the judging/updating unit 1004 has permitted copying of the digital work, the first sub-data recording unit 1005 copies the digital work from the recording medium 1001 to the recording medium 1007.

The first sub-data recording unit 1005 records the file management information stored in the main data storage unit 1003 in the area on the recording medium 1001 in which the file information is stored, as main data, and superimposes the updated copyright management information on the newly-recorded file management information as sub-data.

When the judging/updating unit 1004 has permitted the copying of the digital work, the second sub-data recording unit 1006 records the file management information of the copied digital work on the recording medium 1007, as main data, and superimposes the copyright management information generated by the judging/updating unit 1004 on the file management information as sub-data.

As has been described, according to the present embodiment, copying of a digital work can be controlled by using copyright management information that is recorded as sub-data.

Furthermore, when copying the digital work recorded on the recording medium 1001 to the recording medium 1007, copyright of the digital work can be managed more safely by updating the copyright management information recorded on the recording medium 1001, and superimposing copyright management information that includes copy control information prohibiting copying on the file management information recorded on the recording medium 1007.

(8) Summary of the First Embodiment

As has been described, according to the present embodiment, copyright of a digital work can be managed safely even in a recording medium, such as an optical disc, that does not have an area specifically for rights management, by superimposing copyright management information on main data as sub-data. Furthermore, there is no need for the recording medium to physically have a protected area, such as in a semiconductor memory, for recording the copyright management information. Consequently, the physical area of the recording medium can be uses efficiently.

Furthermore, in the present embodiment, since copyright management information is superimposed on file management information required when reading the digital work from the recording medium, the copyright management information can be read from the recording medium together with the file information. Consequently, rights management can be performed at high speed.

Note that, as is clear from the above-described embodiment, the present invention may be an invention relating to a recording medium or an invention relating to a usage management method. The same effects are obtained in either case. This also applies to the following embodiments.

2. Second Embodiment

The following describes a second embodiment of the present invention.

Figure 12:
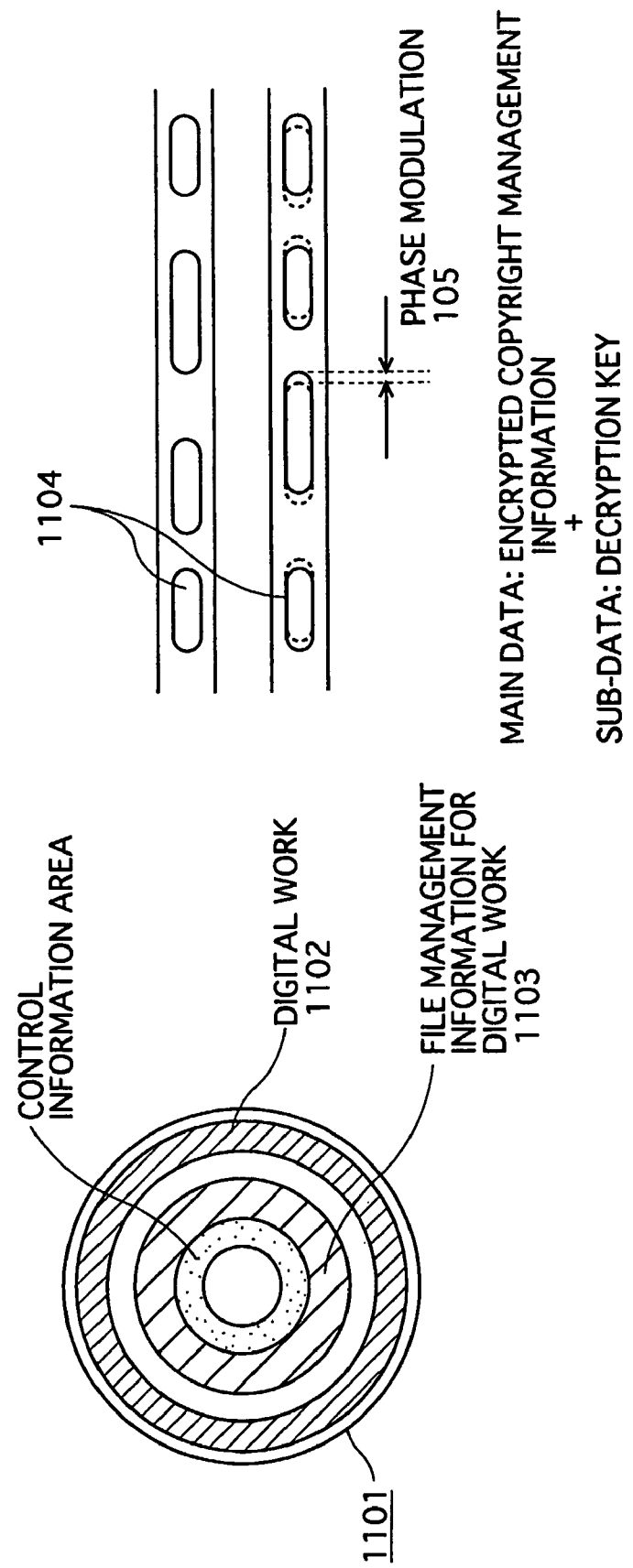
FIG. 12 shows the structure of a recording medium of a second embodiment.

FIG. 12 shows a recording medium in the present embodiment. In FIG. 12, a recording medium 1101 is an optical disc that has a digital work 1102, and encrypted copyright management information 1103 that is the copyright management information for the digital work 1102 recorded in the user area.

The digital work 1102 and the copyright management information 1103 are recorded in the user area using optical-readable recording marks 1104.

The characteristic of the present embodiment lies in recording encrypted copyright management information as main data, and superimposing a decryption key for the copyright management information as sub-data on the main data according to one of the sub-data superimposing methods of the first embodiment.

In this way, in the present embodiment, part of the user area is used as a protected area that cannot be accessed without the decryption key that is recorded as sub-data information recorded in the protected area whose decryption key is the sub-data is not limited to copyright management information. Any information that requires a high degree of protection, such as an encryption key for encrypting the digital work, may be stored in the protected area.

(1) Playback Control Processing in the Present Embodiment

Figure 13:
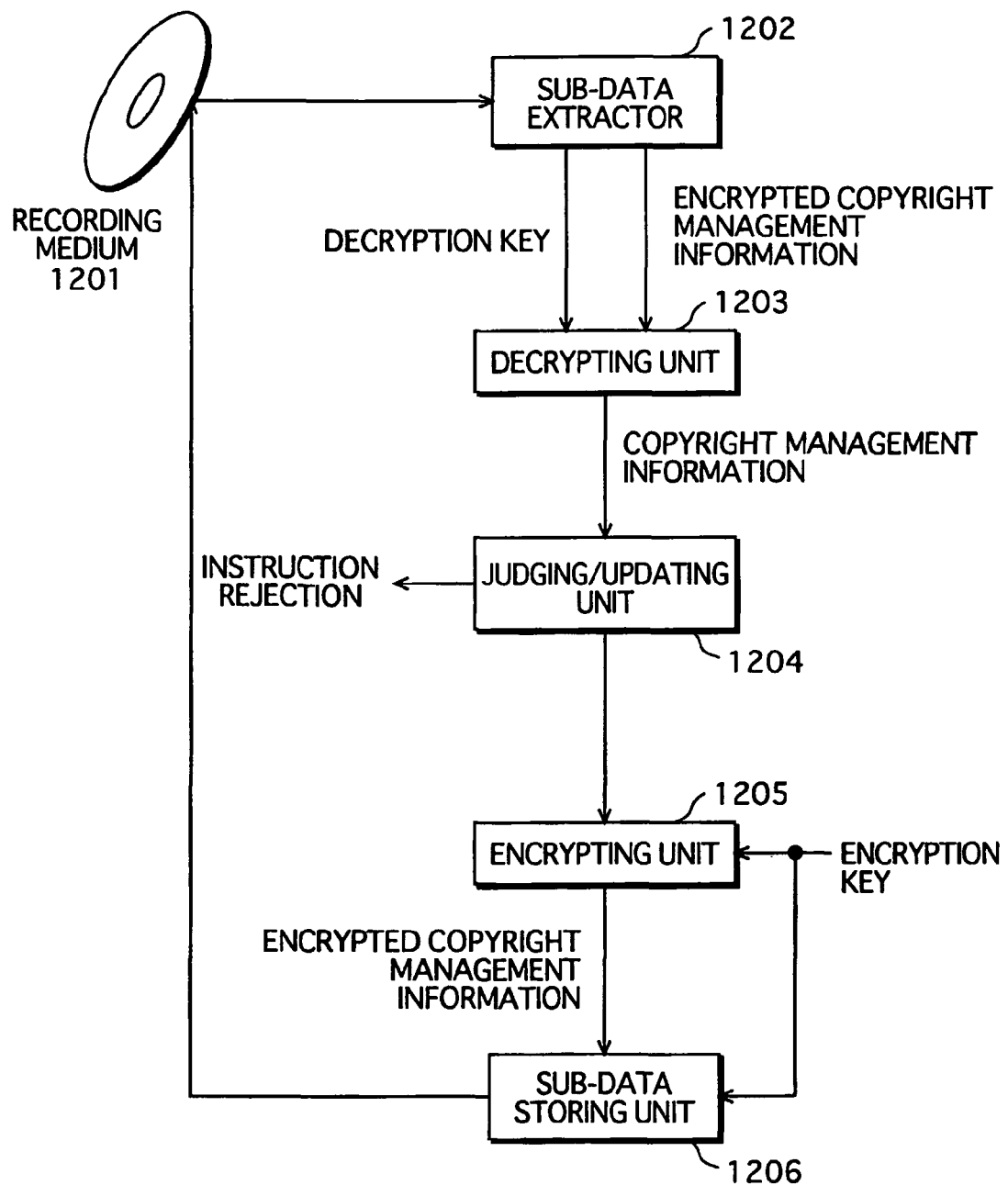
FIG. 13 is a function block drawing showing function blocks necessary for playback control processing in the second embodiment.

The following describes playback control processing in the present embodiment, with reference to the drawings. FIG. 13 is a function block diagram showing the necessary function blocks for the playback control processing in the present embodiment.

As shown in FIG. 13, playback control processing in the present embodiment is realized by a combination of a sub-data extractor 1202, a decrypting unit 1203, an judging/updating unit 1204, and encrypting unit 1205 and a sub-data recording unit 1206.

Note that in the FIG. 13 a recording medium 1201 is an optical disc on which encrypted copyright management information is recorded as main data, and a decryption key therefor is superimposed on the main data as sub-data using the sub-data superimposing method described earlier. The copyright management information includes a possible playback times, a possible playback time or a possible playback term as playback control information for the digital work.

The sub-data extractor 1202 corresponds to the player to which the sub-data superimposing methods were described earlier as being applied. The sub-data extractor 1202, on receiving a playback instruction from the system controller, reads the copyright management information corresponding to the digital work from the recording medium 1201, and also reads the decryption key that is superimposed on the copyright management information. The sub-data extractor 1202 outputs the encrypted rights information and the decryption key to the decrypting unit 1203.

On receiving the copyright management information and the decryption key from the sub-data extractor 1202, the decrypting unit 1203 decrypts the copyright management information using the decryption key, and outputs the decrypted copyright management information to the judging/updating unit 1204.

The judging/updating unit 1204 judges whether the digital work may be played back, by referring to the playback control information.

When, for example, a permitted playback times is included in the copyright management information, the judging/updating unit 1204 judges whether the permitted playback times is "0", and if the judgement is negative, permits playback of the digital work. If the judgement is positive, the judging/updating unit 1204 rejects the playback instruction and ends the processing.

When playback is permitted, after playback of the digital work is completed, the judging/updating unit 1204 subtracts "1" from the permitted playback times of the digital work, and outputs the updated copyright management information to the encoding unit 1205.

When, for example, a permitted playback time is included in the copyright management information, the judging/updating unit 1204 judges whether the permitted playback time is "0", and if the judgement is negative, permits playback of the digital work. If the judgement is positive, the judging/updating unit 1204 rejects the playback instruction and ends the processing.

After playback of the digital work is finished, the judging/updating unit 1204 calculates the time for which the digital work was played back. A new possible playback time is obtained by subtracting the obtained time from the original possible playback time. The judging/updating unit 1204 outputs the copyright management information updated in this way to the encrypting unit 1205.

When, for example, a possible playback term is included in the copyright management information, the judging/updating unit 1204 judges whether the present time is included in the possible playback term, and if the judgement is positive, permits playback of the digital work. If the judgement is negative, the judging/updating unit 1204 rejects the playback instruction, and ends the processing.

The encrypting unit 1205 encrypts the received copyright management information using a random number obtained from a random number generator as the encryption key, and outputs the encrypted copyright management information and the encryption key to the sub-data recording unit 1206.

The sub-data recording unit 1206 corresponds to the recorder to which the sub-data superimposing methods were described earlier as being applied. When playback of the digital work is permitted, the sub-data recording unit 1206 updates the copyright management information on the recording medium 1201.

Specifically, the sub-data recording unit 1206 records the encrypted copyright management information as main data, and superimposes the encryption key on the main data on the recording medium 1201 as sub-data.

(2) Move Control Processing in the Present Embodiment

Figure 14:
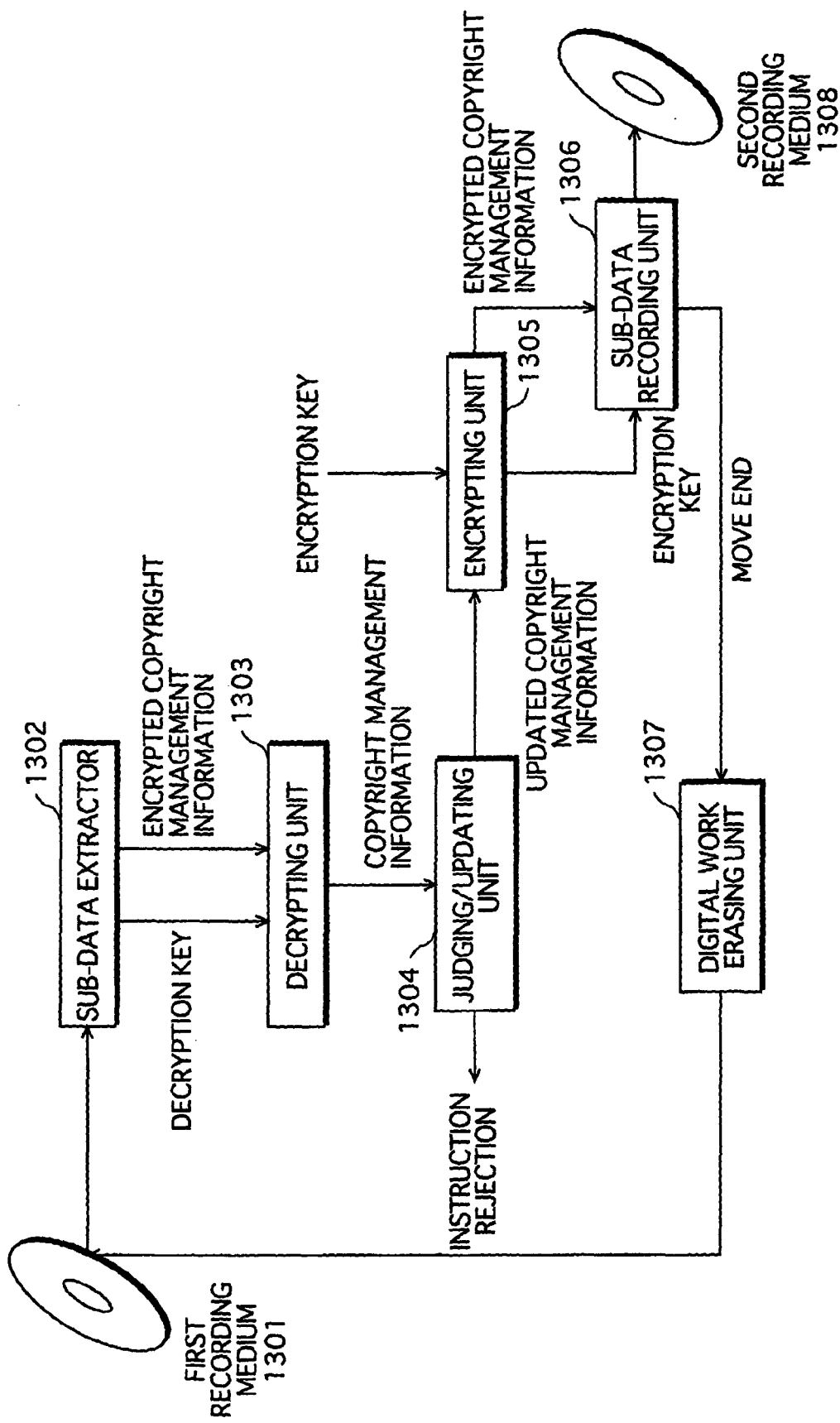
FIG. 14 is a function block drawing showing function blocks necessary for move control processing in the second embodiment.

The following describes move control processing in the present embodiment, with reference to the drawings. FIG. 14 is a function block diagram showing necessary function blocks for move control processing in the present embodiment.

As shown in FIG. 14, move control processing is the present embodiment is realized by combining a sub-data extractor 1302, a decrypting unit 1303, a judging/updating unit 1304, an encrypting unit 1305, a sub-data recording unit 1306 and a digital work erasing unit (hereinafter referred to simply as an "erasing unit") 1307.

Note that FIG. 14 shows a case of moving a digital work from a recording medium 1301 to a recording medium 1308. The information recording media 1301 and 1308 are both optical discs, and have recorded thereon in the user area encrypted copyright management information as main data on which a decryption key is superimposed as sub-data using one of the described sub-data superimposing methods.

The sub-data extractor 1302 corresponds to the player to which the sub-data superimposing method was described earlier as being applied. On receiving a move instruction from the system controller, the sub-data extractor 1302 reads the encrypted copyright management information for the digital work recorded on the recording medium 1301, and also reads the decryption key for the copyright management information. The sub-data extractor 1302 then outputs the copyright management information and the decryption key to the decrypting unit 1303.

On receiving the copyright management information and the decryption key from the sub-data extractor 1302, the decrypting unit 1303 decrypts the copyright management information using the decryption key, and outputs the decrypted copyright management information to the judging/updating unit 1304.

On receiving the copyright management information from the decrypting unit 1303, the judging/updating unit 1304 judges whether the digital work may be moved, by referring to the move control information in the copyright management information.

When, for example, a possible move times is designated as the move control information, the judging/updating unit 1304 judges whether the possible move times is "0", and permits the digital work to be moved if the judgement is negative. If the judgement is positive, the judging/updating unit 1304 rejects the move instruction and ends the processing.

When, for example, a possible move term is designated as the move control information, the judging/updating unit 1304 judges whether the present time is within the possible move term, and if the judgement is positive, permits the digital work to be moved. If the judgement is negative, the judging/updating unit 1304 rejects the move instruction and ends the processing.

When the digital work is permitted to be moved, the judging/updating unit 1304 subtracts "1" from the possible move times, and outputs the updated copyright management information to the encrypting unit 1305.

On receiving the copyright management information from the updating/judging unit 1304, the encrypting unit 1305 encrypts the copyright management information using a random number obtained from the random number generator as the encryption key, and outputs the encrypted copyright management information and the encryption key to the sub-data recording unit 1306.

The sub-data recording unit 1306 corresponds to the recorder to which the sub-data superimposing methods were described earlier as being applied. When the digital work is permitted to be moved, the sub-data recording unit 1306 updates the copyright management information on the recording medium 1301.

Specifically, the sub-data recording unit 1306 records the encrypted copyright management information as main data, and superimposes the encryption key on the main data on the recording medium 1301 as sub-data. After the move has finished, the sub-data recording unit 1306 notifies the erasing unit 1307 that move has finished.

On receiving notification that move has finished, the erasing unit 1307 erases the file management information of the digital work from the recording medium 1301.

As described, according to the present embodiment, moving of a digital work between recording media can be controlled by recording encrypted copyright management information as main data and superimposing the decryption key for the main data thereon as sub-data.

In addition, the copyright of the digital work can be managed even more safely by erasing the file management information of the digital work from the original recording medium straight after the move to the destination recording medium has been completed.

(3) Copy Control Processing in the Present Embodiment

Figure 15:
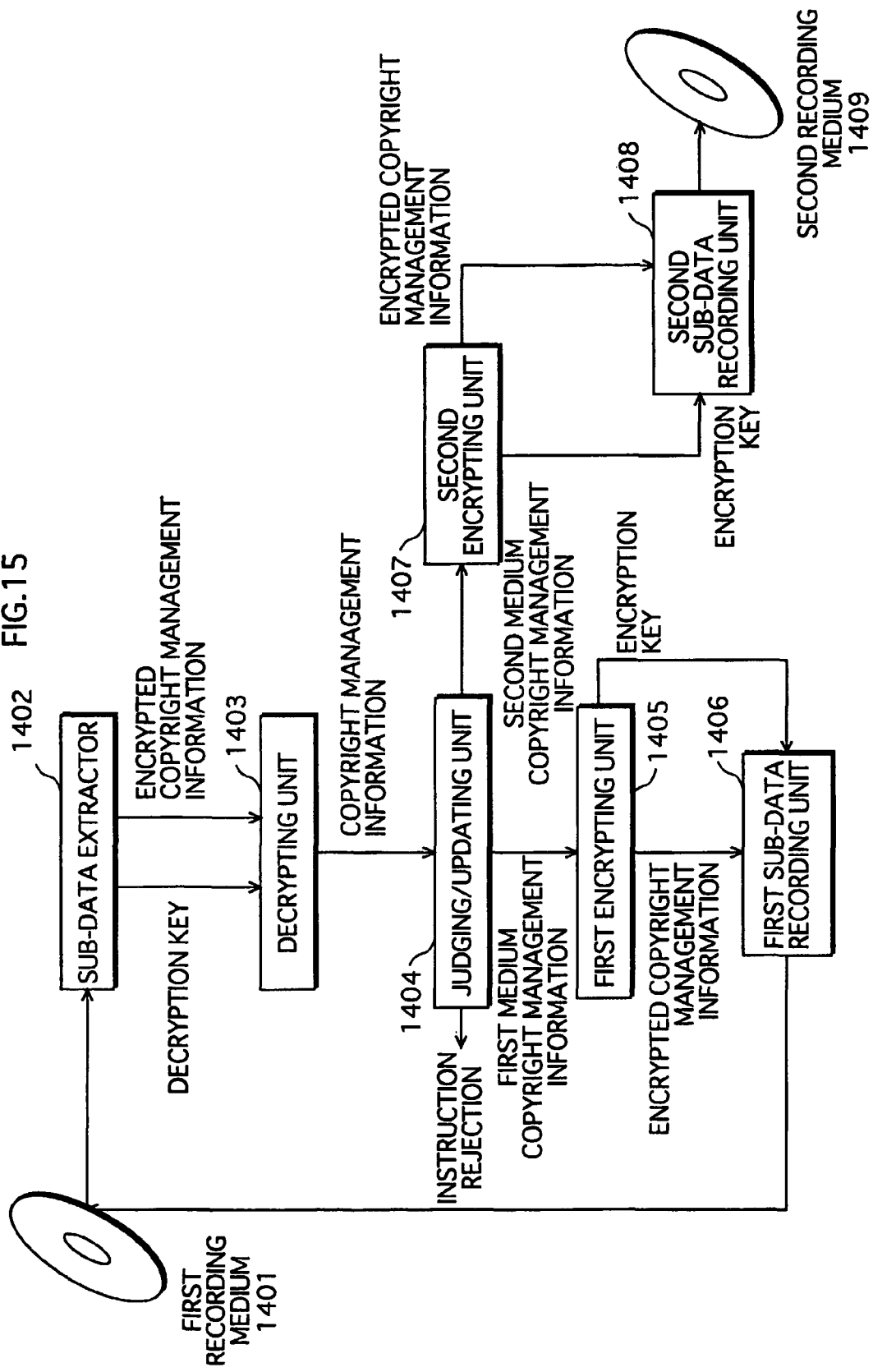
FIG. 15 is a function block drawing showing function blocks of a usage management apparatus that controls copying in the second embodiment.

The following describes copy control processing in the present embodiment, with reference to the drawings. FIG. 15 is a function block diagram showing necessary function blocks for executing copy control processing.

As shown in FIG. 15, copy control processing in the present embodiment is realized by combining a sub-data extractor 1402, a decrypting unit 1403, a judging/updating unit 1404, a first encrypting unit 1405, a first sub-data recording unit 1406, a second encrypting unit 1407 and a second sub-data recording unit 1408.

Note that FIG. 15 shows a case of copying a digital work stored on a recording medium 1401 to a recording medium 1409.

The recording media 1401 and 1409 are both optical discs, and store in the user area encrypted copyright management information as main data, on which an encryption key for the main data is superimposed thereon as sub-data using one of the sub-data superimposing methods described earlier.

The sub-data extractor 1402 corresponds to the player to which the sub-data superimposing method was described earlier as being applied. On receiving a copy instruction from the system controller, the sub-data-extractor 1402 reads the encrypted copyright management information and the decryption key from the recording medium 1401, and outputs the read encrypted copyright management information and the decryption key to the decrypting unit 1403.

On receiving the encrypted copyright management information and the decryption key from the sub-data extractor 1402, the decrypting unit 1403 decrypts the copyright management information using the decryption key, and outputs the decrypted copyright management information to the judging/updating unit 1404.

On receiving the copyright management information from the decrypting unit 1403, the judging/updating unit 1404 judges whether the copying of the digital work is permitted, by referring to the copyright management information.

When, for example, a possible copy times is designated as the copy control information, the judging/updating unit 1404 judges whether the permitted copy times is "0", and if the judgement is negative, permits copying of the digital work. If the judgement is positive, the updating/judgement unit 1404 rejects the copy instruction and ends the processing.

When, for example, a possible copy term is designated as the copy control information, the judging/updating unit 1404 judges whether the present time is within the possible copy term, and if the judgement is positive, permits copying of the digital work. If the judgement is negative, the judging/updating unit 1404 rejects the copy instruction and ends the processing.

When copying of the digital work is permitted, the judging/updating unit 1404 subtracts "1" from the value of the possible copy times, and outputs updated copyright management information to the first encrypting unit 1405.

In addition, the judging/updating unit 1404 generates copyright management information in which the possible copy times is "0" as the copyright management information for the digital work copied to the recording medium 1409, and outputs the generated copyright management information to the second encryption unit 1407.

The first encrypting unit 1405 encrypts the copyright management information received from the judging/updating unit 1404 using a random number obtained from the random number generator as the encryption key, and outputs the encrypted copyright management information and the encryption key to the first sub-data recording unit 1406.

The first sub-data recording unit 1406 corresponds to the recorder to which the sub-data superimposing methods were described earlier as being applied. When copying of the digital work is permitted, the first sub-data recording unit 1406 copies the digital work from the recording medium 1401 to the recording medium 1409.

In addition, the first sub-data recording unit 1406 records the encrypted copyright management information on the recording medium 1401 as main data, and superimposes the encryption key for main data thereon as sub-data.

The second encrypting unit 1407 encrypts the copyright management information received from the judging/updating unit 1404, using a random number obtained from the random number generator as the encryption key, and outputs the encrypted copyright management information and the encryption key to the second sub-data recording unit 1408.

The second sub-data recording unit 1408 corresponds to the recorder to which the sub-data superimposing methods were described earlier as being applied. When copying of the digital work is permitted, the second sub-data recording unit 1408 records the encrypted copyright management information received from the second encrypting unit to the recording medium 1409 as main data, and superimposes the encryption key for the main data thereon as sub-data.

As has been described, according to the present embodiment, copying of a digital work can be controlled by recording encrypted copyright management information as main data in the user area, and superimposing the decryption key for the main data thereon as sub-data.

Furthermore, when the digital work is copied, copyright of the digital work can be managed more safely by superimposing information showing the digital work cannot be copied to another recording medium on the copyright management information on the copy-destination recording medium as sub-data.

In addition, according to the present embodiment, copyright management information can be updated safely when the digital work is played back or the like, by recording encrypted copyright management information as main data and superimposing the decryption key for the main data thereon as sub-data.

Furthermore, according to the present embodiment, information stored in a particular area can be encrypted, and the decryption key for the information can be superimposed on the information as sub-data. Consequently, the particular area can be used as a protected area that can only be accessed by a system that can read the sub-data. This enables information that requires a high degree of protection to be recorded safely, even on a recording medium that does not originally have a protected area.

3. Third Embodiment

The following describes a third embodiment of the present invention.

Figure 16:
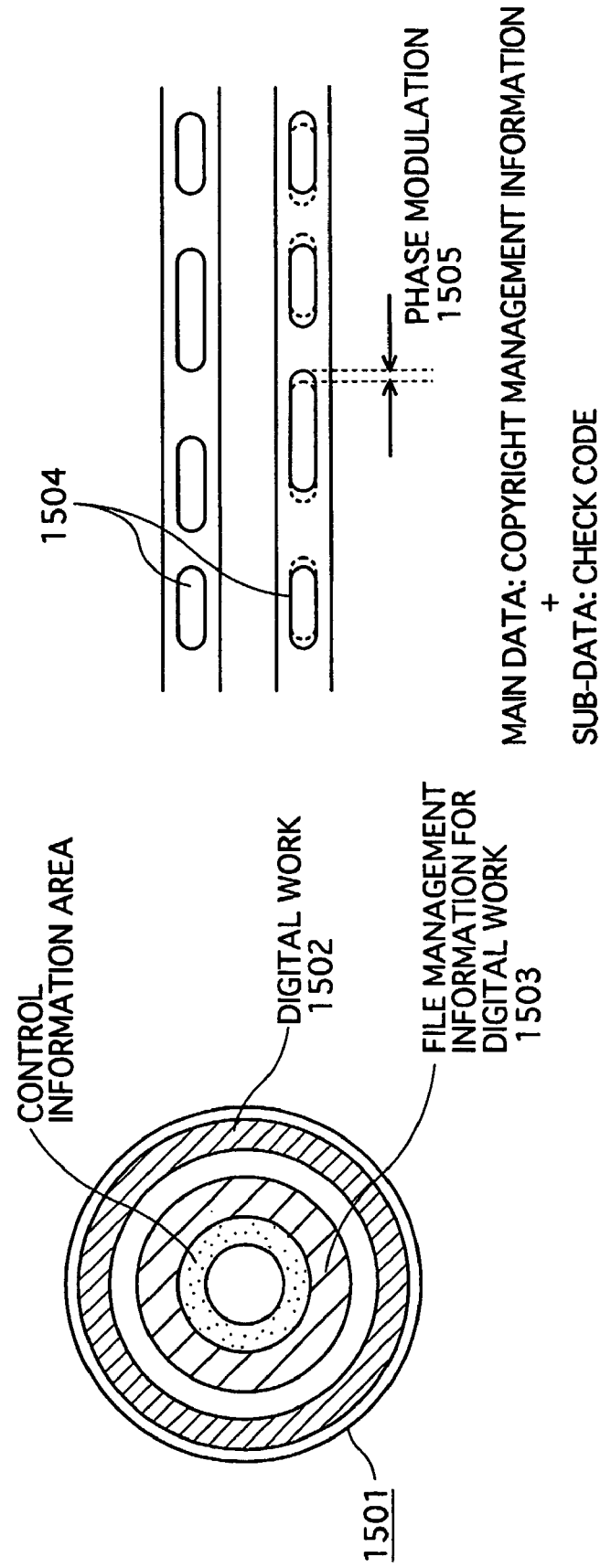
FIG. 16 shows the structure of a recording medium of a third embodiment.

FIG. 16 shows the recording medium of the present embodiment. In FIG. 16, a recording medium 1501 is an optical disc, and recorded on the recording medium 1501 with use of optical-readable recording marks 1504 are a digital work 1502 and copyright management information 1503.

The characteristic of the present embodiment lies in recording encrypted copyright management information as main data, and superimposing a check code for the copyright management information as sub-data on the main data according to one of the sub-data superimposing method of the first embodiment.

In this way, when reading the copyright management information 1502 from the recording medium 1501, it can be judged whether the copyright management information is recorded correctly, by comparing the check code with a check code generated from the copyright management information. This enables the copyright of the digital work recorded on the recording medium to be managed safely.

An additional advantage to using a check code is that, regardless of the amount of data of the copyright management information, the check code has a minimal data size, and therefore does not consume a significant amount of storage area.

Note that the copyright management information 1501 is the same as in the first or second embodiments, and is, for example, data for controlling playback, moving, or copying the digital work.

(1) Playback Control Processing in the Present Embodiment

Figure 17:
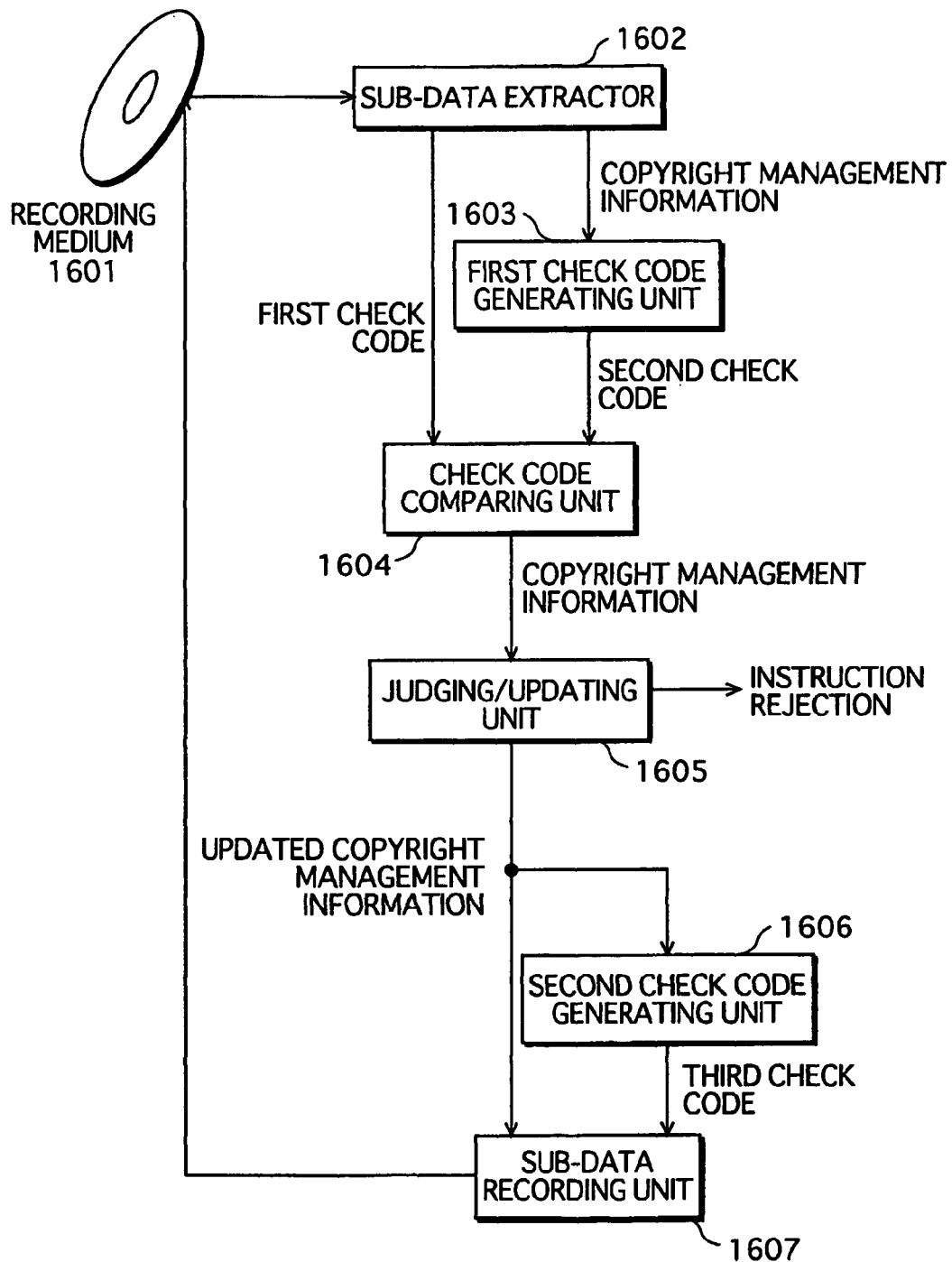
FIG. 17 is a function block drawing showing function blocks necessary for playback control processing in the third embodiment.

The following describes playback control processing in the present embodiment, with reference to the drawings. FIG. 17 is a block function drawing showing necessary function blocks for playback control processing in the present embodiment.

As shown in FIG. 17, playback control processing in the present embodiment is realized by a combination of a sub-data extractor 1602, a first check code generating unit 1603, a check code comparing unit 1604, a judging/updating unit 1605, a second check code generating unit 1606 and a sub-data recording unit 1607.

The sub-data extractor 1602 corresponds to the player to which the sub-data superimposing methods were described earlier as being applied. The sub-data extractor 1602, on receiving a playback instruction from the system controller, reads the copyright management information corresponding to the designated digital work from the recording medium 1601, and outputs the read copyright management information to the first check code generating unit 1603.

In addition, the sub-data extractor 1602 reads the check code that is superimposed on the copyright management information (hereinafter this check code is referred to as a "first check code"), and outputs the first check code to the check code comparing unit 1604.

Figure 18:
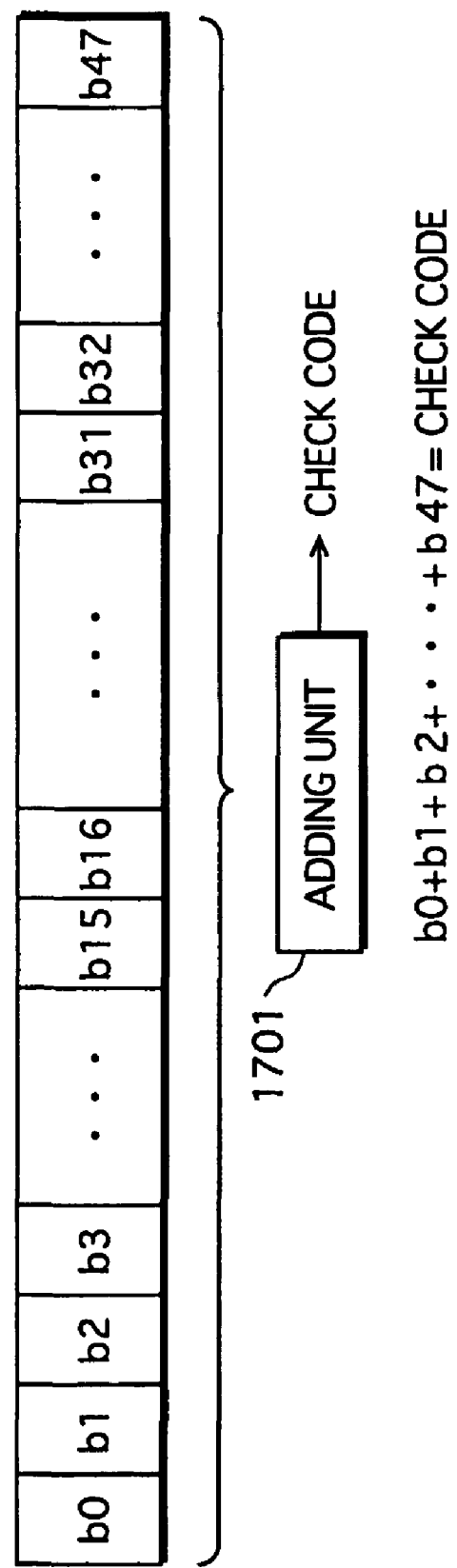
FIG. 18 is a function block drawing showing a typical function structure of a first check code generating unit 1603.

The first check code generating unit 1603 generates a check code from the copyright management information received from the sub-data extractor 1602 (hereinafter this check code is referred to as a "second check code"). FIG. 18 is a function block drawing showing a typical function structure of the first check code comparing unit 1603. As shown in FIG. 18 the first check code generator 1603 includes an adding unit 1701.

The adding unit 1701 calculates a checksum by adding all bits of the copyright management information received from the sub-data extractor 1602. This checksum is a second check code. The first check code generating unit 1603 outputs the copyright management information and the second check code to the check code comparing unit 1604.

The check code comparing unit 1604 compares the first check code received from the sub-data extractor 1602 and the second check code received from the first check code generating unit 1603.

When the first check code and the second check code are identical, the check code comparing unit 1604 outputs the copyright management information received from the first check code generating unit 1603 to the judging/updating unit 1605. When the first check code and the second check code are not identical, the check code comparing unit 1604 judges that the right management information is not recorded normally, and therefore rejects the playback instruction and ends the processing.

On receiving the copyright management information from the check code comparing unit 1604, the judging/updating unit 1605 judges whether the digital work is permitted to be played back, by referring to the playback control information.

When, for example, a permitted playback times is designated as the playback control information, the updating/judging unit 1605 judges whether the permitted playback times is "0", and if the judgement is negative, permits playback of the digital work. If the judgement is positive, the judging/updating unit 1605 rejects the playback instruction and ends the processing.

After playback of the digital work complete, the updating/judging unit 1605 subtracts "1" from the permitted playback times, and outputs updated copyright management information to the second check code generating unit 1606 and the sub-data recording unit 1607.

When, for example, a possible playback time is designated as the playback control information, the judging/updating unit 1605 judges whether the possible playback time is "0", and if the judgement is negative, permits playback of the digital work. If the judgement is positive, the judging/updating unit 1605 rejects the playback instruction and ends the processing.

After playback is complete, the judging/updating unit 1605 calculates the amount of time for which the digital work was played back, and subtracts the calculated time from the value of the possible playback time. The judging/updating unit 1605 then outputs updated copyright management information to the second check code generating unit 1606 and the sub-data recording unit 1607.

When, for example, a possible playback term is designated as the copyright management information, the judging/updating unit 1605 judges whether the present time is included in the possible playback term, and if the judgement is positive, permits playback of the digital work. If the judgement is negative, the judging/updating unit 1605 rejects the playback instruction, and ends the processing.

The second check code generating unit 1606 generates a check code from the copyright management information received from the updating/judging unit 1605, in the same manner as the first check code generating unit 1603, and outputs the check code to the sub-data recording unit 1607. Hereinafter, this check code is referred to as a "third check code".

The sub-data recording unit 1607 corresponds to the recorder to which the sub-data superimposing methods were described earlier as being applied. When play back of the digital work is permitted, the sub-data recording unit 1607 records the copyright management information received from the judging/updating unit 1605 as main data on the recording medium 1601, and records the third check code as sub-data in the same area of the recording medium as the copyright management information.

In this way, only the copyright management information for the digital work is updated on the recording medium 1601.

(2) Move Control Processing in the Present Embodiment

Figure 19:
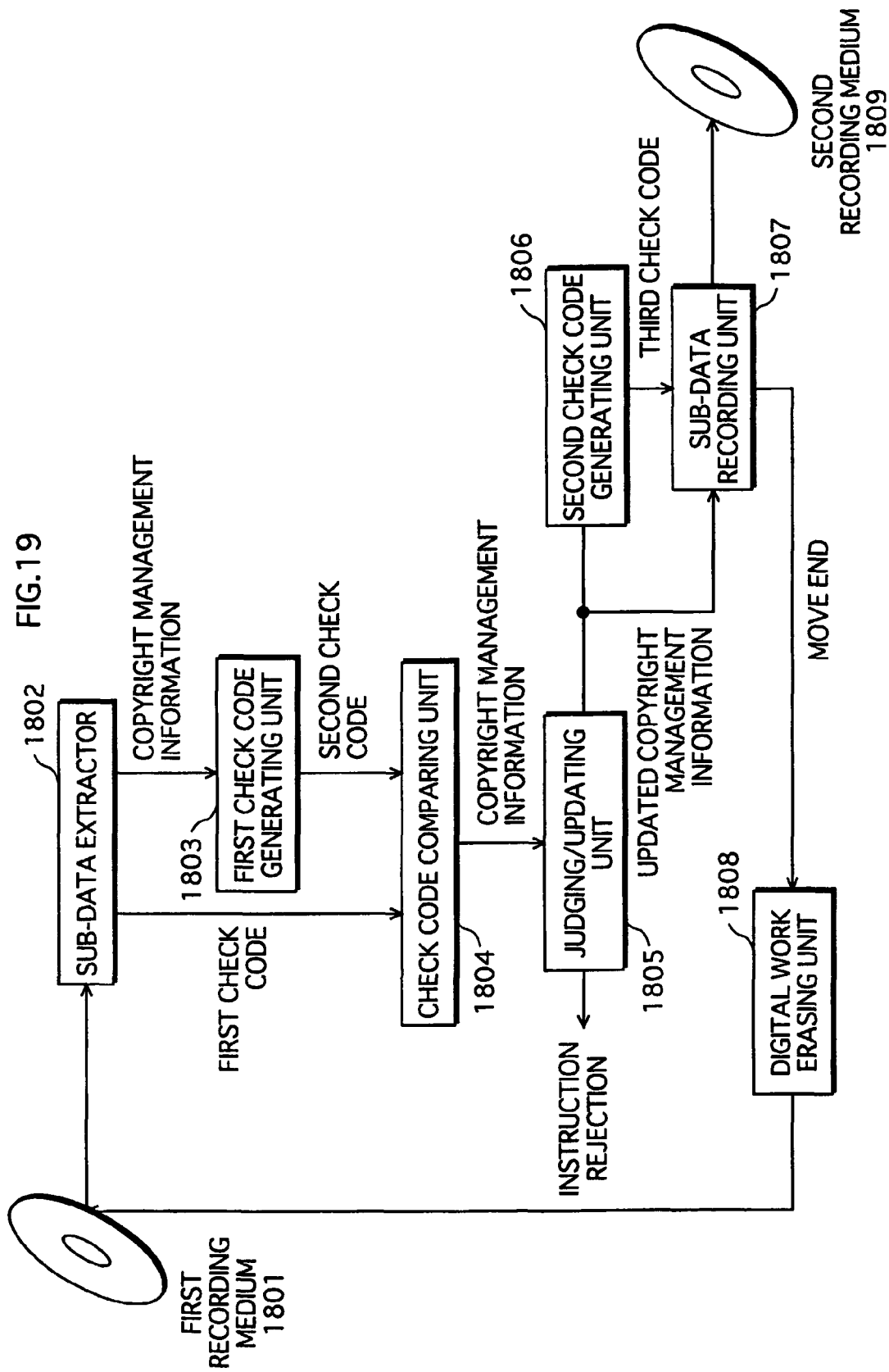
FIG. 19 is a function block drawing showing function blocks necessary for move control processing in the third embodiment.

The following describes move control processing of the present embodiment, with reference to the drawings. FIG. 19 is a function block diagram showing function blocks necessary for the move control processing of the present embodiment.

As shown in FIG. 19, move control processing of the present embodiment is realized by combining a sub-data extractor 1802, a first check code generating unit 1803, a check code comparing unit 1804, a judging/updating unit 1805, a second check code generating unit 1806, a sub-data information unit 1807 and a digital work erasing unit (hereinafter simply referred to as an "erasing unit") 1808.

Note that FIG. 19 shows an example of moving a digital work from a recording medium 1801 to a recording medium 1809.

The information recording media 1801 and 1809 are both optical discs, and have recorded thereon in the user area copyright management information as main data on which a check code is superimposed as sub-data using one of the described sub-data superimposing methods.

In the following case, the copyright management information includes, for example, move control information such as a possible move times or a possible move term.

The sub-data extractor 1802 corresponds to the player to which the sub-data superimposing methods were described earlier as being applied. On receiving a move instruction from the system controller, the sub-data extractor 1802 reads the copyright management information corresponding to the designated digital work, and outputs the right management information to the first check code generating unit 1803.

In addition, the sub-data extractor 1802 reads the check code superimposed on the copyright management information (hereinafter this check code is referred to as a "first check Code"), and outputs the first check code to the check code comparing unit 1804.

The first check code generating unit 1803 generates a check code from the copyright management information received from the sub-data extractor 1802 (hereinafter, this check code is referred to as the "second check code"), and outputs the copyright management information and the second check code to the check code comparing unit 1804.

The check code comparing unit 1804 compares the first check code received from the sub-data extractor 1802 and the second check code received from the first check code generating unit 1803.

When the first check code and the second check code are identical, the check code comparing unit 1804 outputs the copyright management information received from the first check code generating unit 1803 to the judging/updating unit 1805. When the first check code and the second check code are not identical, the check code comparing unit 1804 rejects the move instruction and ends the processing.

On receiving the copyright management information from the check code comparing unit 1804, the judging/updating unit 1805 judges whether the digital work may be moved, by referring to the move control information.

When, for example, a possible move times is designated as the move control information, the judging/updating unit 1805 judges whether the possible move times is "0", and if the judgement is negative, permits the digital work to be moved. If the judgement is positive, the judging/updating unit 1805 rejects the move instruction and ends the processing.

When, for example, a possible move term is designated as the move control information, the judging/updating unit 1805 judges whether the present time is within the possible move term, and if the judgement is positive, permits the digital work to be moved. If the judgement is negative, the judging/updating unit 1805 rejects the move instruction and ends the processing.

When the digital work is permitted to be moved, the judging/updating unit 1805 subtracts "1" from the possible move times, and outputs updated copyright management information to the second check code generating unit 1806 and the sub-data recording unit 1807.

The second check code generating unit 1806 generates a check code from the copyright management information received from the judging/updating unit 1805 in the same manner as the first check code generating unit 1803, and outputs the generated check code to the sub-data recording unit 1807. Hereinafter, this check code is referred to a "third check code".

The sub-data recording unit 1807 corresponds to the recorder to which the sub-data superimposing methods were described earlier as being applied. When the digital work is permitted to be moved, the sub-data recording unit 1807 records the copyright management information received from the judging/updating unit 1805 and the third check code on the recording medium 1809 as main data and sub-data, respectively. After the digital work has been moved to the recording medium 1809 the sub-data extractor 1807 notifies the erasing unit 1808 that the move has finished.

On receiving the notification from the sub-data recording unit 1807, the erasing unit 1808 erases the file management information of the digital work from the recording medium 1801.

According to the present embodiment, by recording the file management information as main data and the check code therefor as sub-data as described, moving of the digital work can be controlled.

Furthermore, moving of the digital work can be controlled by erasing file management information of the digital work from the original recording medium.

(3) Copy Control Processing in the Present Embodiment

The following describes copy control processing in the present embodiment, with reference to the drawings. FIG. 20 is a function block diagram showing necessary function blocks for executing copy control processing.

As shown in FIG. 20, the move control processing of the present embodiment is realized by combining a sub-data extractor 1902, a first check code generating unit 1903, a check code comparing unit 1904, a judging/updating unit 1905, a second check code generating unit 1906, a first sub-data recording unit 1907, a third check code generating unit 1908 and a second sub-data information storing unit 1909.

Note that FIG. 20 shows an example of copying a digital work from a recording medium 1901 to a recording medium 1910.

The recording media 1901 and 1910 are both optical discs, and store in the user area copyright management information as main data, on which a check code therefor is superimposed as sub-data using one of the sub-data superimposing method described earlier.

In the following description, the copyright management information includes, for example, copy control information such as a possible copy times or a possible copy term.

On receiving a copy instruction from the system controller, the sub-data extractor 1902 reads the copyright management information corresponding to the designated digital work from the recording medium 1901, and outputs the copyright management information to the first check code generator 1903.

In addition, the sub-data extractor 1902 reads the check code superimposed on the copyright management information (hereinafter, this check code is referred to as a "first check code"), and outputs the first check code to the check code comparing unit 1904.

The first check code generating unit 1903 generates a check code from the copyright management information received from the sub-data extractor 1902 (hereinafter this check code is referred to as a "second check code"), and outputs the copyright management information and the second check code to the check code comparing unit 1904.

The check code comparing unit 1904 compares the first check code received from the sub-data extractor 1902 and the second check code received from the first check code generating unit 1903.

When the first check code and the second check code are identical, the check code comparing unit 1904 outputs the copyright management information received from the first check code generating unit 1903 to the judging/updating unit 1905. When the first check code and the second check code are not identical, the check code comparing unit 1904 rejects the copy instruction and ends the processing.

On receiving the copyright management information from the check code comparing unit 1904, the judging/updating unit 1905 judges whether the digital work is permitted to be copied, by referring to the copy control information.

When, for example, a permitted copy times is designated as the copy control information, the updating/judging unit 1905 judges whether the permitted copy times is "0", and if the judgement is negative, permits copying of the digital work. If the judgement is positive, the judging/updating unit 1905 rejects the copy instruction and ends the processing.

When, for example, a possible copy term is designated as the copyright management information, the judging/updating unit 1905 judges whether the present time is included in the possible copy term, and if the judgement is positive, permits copying of the digital work. If the judgement is negative, the judging/updating unit 1905 rejects the copy instruction, and ends the processing.

When copying of the digital work is permitted, the judging/updating unit 1905 subtracts "1" from the possible copy times, and outputs updated copyright management information to the second code check generating unit 1906 and the first sub-data recording unit 1907.

In addition, the judging/updating unit 1905 generates copyright management information for the digital work copied to the recording medium 1910 in which the possible copy times is "0", and outputs the generated copyright management information to the third check code generating unit 1907 and the second sub-data recording unit 1909.

The second check code generating unit 1906 generates a check code from the copyright management information received from the updating/judging unit 1905, in the same manner as the first check code generating unit 1903, and outputs the check code to the sub-data recording unit 1907. Hereinafter, this check code is referred to as a "third check code".

The sub-data recording unit 1907 corresponds to the recorder to which the sub-data superimposing methods were described earlier as being applied. When playback of the digital work is permitted, the first sub-data recording unit 1907 copies the digital work from the recording medium 1901 to the recording medium 1910.

In addition, the first sub-data recording unit 1907 records the copyright management information received from the judging/updating unit 1905 and the third check code to the recording medium as main data and sub-data, respectively.

The third check code generating unit 1908 generates a check code from the copyright management information received from the updating/judging unit 1905, in the same manner as the first check code generating unit 1903 and the second check code generating unit 1906, and outputs the check code to the second sub-data recording unit 1909. Hereinafter, this check code is referred to as a "fourth check code".

The second sub-data recording unit 1909 corresponds to the recorder to which the sub-data superimposing methods were described earlier as being applied. When copying of the digital work is permitted, the second sub-data recording unit 1909 records the copyright management information received from the judging/updating unit 1905, and superimposes the fourth check code on the copyright management information.

(4) Summary of the Third Embodiment

As has been described, in the present embodiment copyright management information of the digital work is recorded in the user area of the recording medium as main data, and a check code is superimposed on the main data as sub-data. When the digital work is read from the recording medium, the check code is compared with the check code generated from the copyright management information.

Consequently, any tampering, for example, with the copyright management information can be detected, thus enabling the copyright of the digital work to be managed safely.

An additional advantage to using a check code is that, regardless of the amount of data of the copyright management information, the check code has a minimal data size, and therefore does not use a significant storage area. Consequently, the present embodiment is particularly effective when recording a digital work on a small-capacity recording medium.

Note that the check codes are information for detecting alterations in the data, and, for example, are error correction codes. CRCs (cyclic redundancy codes) are a possible alternative.

4. Modifications

The present invention is not limited to the above-described above embodiments. Alterations such as the following are possible.

(1) Regarding the Main Data

In the embodiments, examples are given as the main data recorded on the recording medium being a digital work, file information for the digital work, copyright management information for the digital work or encrypted copyright management information for the digital work. The main data is not limited to these examples, and includes all data that is recorded on the recording medium according to recording marks or recording pits, regardless of content.

(2) Regarding the Information Recording Media

Although information recording media are described as being optical discs in the above-described embodiments, the present invention is effective for any recording medium on which recording marks or recording pits are formed magnetically, optically, or a combination of magnetically and optically.

(3) Regarding the Sub-Data Superimposing Method

The following modifications may be made when applying the second sub-data superimposing method in the first embodiment to something other than an optical disc.

Specifically, the second sub-data superimposing method may be applied to a communication method that uses a SYNC signal, including information communication and digital broadcasting. Sub-data can be superimposed on main data in the same way as on an optical disc, by altering the SYNC signal used in the communication method.

According to this method, the copyright management information relating to digital contents that are transmitted in the communication method can be transmitted safely.

(4) Regarding Updating the Main Data and the Sub-Data

In the embodiments data that is no longer permitted to be read when, for example, the possible playback times is "0", is made unreadable by erasing the file management information for the data. However, the present invention is not limited to making data unreadable in this manner.

Playback, moving and copying of a digital work included in the copyright management information may be prohibited by erasing condition information such as the sub-data relating to the possible playback times.

5. Effects of the Invention

According to the present invention, copyright management information can be recorded safely, even in a recording medium that does not have a protected area such as that of a semiconductor memory. Specifically, use of the recording medium of the present invention provides: a digital work for which a possible playback times, a possible playback time or a possible playback term can be designated, a digital work for which a possible move times or a possible move term can be designated, a digital work for which the number of copies that exist can be designated, or a digital work a possible copy term can be designated.

Furthermore, according the present invention, only the main data can be read using an ordinary method. If the sub-data is not read, the copyright management information cannot be read. Consequently, illegal use of the digital work can be prevented since copying and tampering with the copyright management information is difficult.

Furthermore, if the sub-data recorder and the sub-data player in the above-described embodiments are provided secretly inside the system, all or part of the user area of the information recording area is unable to be accessed without reading the sub-data. Consequently, the user area can be used as a protected area that can in actuality be accessed only by the system.

The invention claimed is:
1. A usage management method for regulating usage of a digital work,
    wherein information relating to the digital work is recorded on an information recording medium as main data, the main data being recorded on the information recording medium by forming a recording mark by laser irradiation, and
    wherein copyright management information for the digital work is recorded in an area on the information recording medium in which the information relating to the digital work is recorded, as sub-data superimposed on the main data, by intentionally altering one of a position, a shape and a pattern of the recording mark,
    the usage management method comprising:
    a main data extracting step of extracting, as the main data, the information relating to the digital work from reflected light generated by the laser irradiation to the recording mark;
    a sub-data extracting step of, simultaneously to the main data being extracted from the reflected light in the main data extracting step, extracting, as the sub-data, the copyright management information of the digital work by extracting, from the reflected light, the intentional alteration of the one of the position, the shape and the pattern of the recording mark;
    a main data storing step of temporarily storing the information relating to the digital work extracted in the main data extracting step;
    a sub-data storing step of temporarily storing the copyright management information of the digital work extracted in the sub-data extracting step;
    an updating step of, after the digital work is used, updating the copyright management information temporarily stored in the sub-data storing step, in accordance with a condition designated in the copyright management information;
    a main data recording step of recording, by forming a recording mark by laser irradiation, the information relating to the digital work stored in the main data storing step to the area of the information recording medium from which the information relating to the digital work has been extracted in the main data extracting step; and
    a sub-data recording step of updating only the copyright management information in the information recording medium by recording, simultaneously to the information relating to the digital work being recorded in the main data recording step, to the area of the information recording medium, the copyright management information updated in the updating step as sub-data superimposed on the main data by modulating the laser irradiation or displacing a position of the laser irradiation in the main data recording step so as to intentionally alter one of the position, the shape and the pattern of the recording mark.

2. The method of claim 1, further comprising a usage request receiving step of receiving a usage request, wherein
    the copyright management information includes a condition for one of playing back, moving and copying the digital work, and
    the updating step updates the copyright management information in accordance with a condition that is included in the copyright management information and that corresponds to the usage request.

3. The method of claim 2, wherein
    the condition for playing back the digital work includes one of a possible playback times, a possible playback time, and a possible playback term,
    the condition for moving the digital work includes one of a possible move times, a possible move time, and a possible move term, and the condition for copying the digital work includes one of a possible copy times, a possible copy time, and a possible copy term.

4. The method of claim 1, wherein
the updating step erases part or all of the main data or the sub-data in accordance with the condition.

5. A usage management apparatus for regulating usage of a digital work,
wherein information relating to the digital work is recorded on an information recording medium as main data, the main data being recorded on the information recording medium by forming a recording mark by laser irradiation, and
wherein copyright management information for the digital work is recorded in an area on the information recording medium in which the information relating to the digital work is recorded, as sub-data superimposed on the main data, by intentionally altering one of a position, a shape and a pattern of the recording mark,
the usage management apparatus comprising:
a main data extracting unit operable to extract, as the main data, the information relating to the digital work from reflected light generated by the laser irradiation to the recording mark;
a sub-data extracting unit operable to, simultaneously to the main data being extracted from the reflected light by the main data extracting unit, extract, as sub-data, the copyright management information of the digital work by extracting, from the reflected light, the intentional alteration of the one of the position, the shape and the pattern of the recording mark;
a main data storing unit operable to temporarily store the information relating to the digital work extracted by the main data extracting unit;
a sub-data storing unit operable to temporarily store the copyright management information of the digital work extracted by the sub-data extracting unit;
an updating unit operable to, after the digital work is used, update the copyright management information temporarily stored by the sub-data storing unit, in accordance with a condition designated in the copyright management information;
a main data recording unit operable to record, by forming a recording mark by laser irradiation, the information relating to the digital work stored by the main data storing unit to the area of the information recording medium from which the information relating to the digital work has been extracted by the main data extracting unit; and
a sub-data recording unit operable to update only the copyright management information in the information recording medium by recording, simultaneously to the information relating to the digital work being recorded by the main data recording unit, to the area of the information recording medium, the copyright management information updated by the updating unit as sub-data superimposed on the main data by modulating the laser irradiation or displacing a position of the laser irradiation by the main data recording unit so as to intentionally alter one of the position, the shape and the pattern of the recording mark.

6. The usage management apparatus of claim 5, further comprising a usage request receiving unit operable to receive a usage request, wherein
the copyright management information includes a condition for one of playing back, moving, and copying the digital work, and
the updating unit updates the copyright management information in accordance with a condition that is included in the copyright management information and that corresponds to the usage request.

7. The usage management apparatus of claim 6, wherein
the condition for playing back the digital work includes one of a possible playback times, a possible playback time, and a possible playback term,
the condition for moving the digital work includes one of a possible move times, a possible move time, and a possible move term, and
the condition for copying the digital work includes one of a possible copy times, a possible copy time, and a possible copy term.

8. The usage management apparatus of claim 5, wherein
the updating unit erases part or all of the main data or the sub-data in accordance with the condition.

* * * * *